(12) United States Patent
Filonov et al.

(10) Patent No.: US 10,956,502 B2
(45) Date of Patent: Mar. 23, 2021

(54) METHOD OF AND SYSTEM FOR RECOMMENDING FRESH SEARCH QUERY SUGGESTIONS ON SEARCH ENGINE

(71) Applicant: YANDEX EUROPE AG, Lucerne (CH)

(72) Inventors: Yegor Andreevich Filonov, Ozersk (RU); Alisa Dmitrievna Lavrentyeva, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 247 days.

(21) Appl. No.: 16/199,938

(22) Filed: Nov. 26, 2018

(65) Prior Publication Data

US 2019/0354604 A1 Nov. 21, 2019

(30) Foreign Application Priority Data

May 18, 2018 (RU) .......................... RU2018118353

(51) Int. Cl.
*G06F 16/00* (2019.01)
*G06F 16/9032* (2019.01)
(Continued)

(52) U.S. Cl.
CPC ...... *G06F 16/90324* (2019.01); *G06F 16/334* (2019.01); *G06F 16/3325* (2019.01); *G06F 16/3334* (2019.01)

(58) Field of Classification Search
CPC .......... G06F 16/90324; G06F 16/3325; G06F 16/3334; G06F 16/334
See application file for complete search history.

(56) References Cited

U.S. PATENT DOCUMENTS 6,006,225 A 12/1999 Bowman et al.
8,412,699 B1 * 4/2013 Mukherjee .......... G06F 16/2425
707/713
(Continued)

FOREIGN PATENT DOCUMENTS

AU 2016222361 A1 9/2016
CN 106294868 A 1/2017
(Continued)

OTHER PUBLICATIONS

Search Report received on Apr. 1, 2019 in regard to a counterpart Russian Patent Application No. RU2018118353.
(Continued)

*Primary Examiner* — Leslie Wong
(74) *Attorney, Agent, or Firm* — BCF LLP

(57) ABSTRACT

A method and a system for generating fresh query suggestions includes receiving an indication of at least a portion of a given search query, selecting, based on the indication, a set of query suggestions, each of the query suggestion being associated with a frequency of use of a first scale, acquiring a set of fresh query suggestions, each of the fresh query suggestions being associated with a frequency of use of a second scale, scaling each frequency of use of the second scale to obtain a frequency of use of the first scale, merging the set of query suggestions and the set of fresh query suggestions to generate an amalgamated suggestions set, and generating a subset of ranked query suggestions for displaying on a device based on the amalgamated suggestions set, a given query suggestion of the subset being one of a fresh query suggestion and a query suggestion.

38 Claims, 10 Drawing Sheets

(51) Int. Cl.
*G06F 16/33* (2019.01)
*G06F 16/332* (2019.01)

(56) References Cited

U.S. PATENT DOCUMENTS

| | | | |
|---|---|---|---|
| 8,412,728 B1 * | 4/2013 | Roskind | G06F 16/338 |
| | | | 707/767 |
| 8,521,739 B1 | 8/2013 | Pasca et al. | |
| 8,868,591 B1 | 10/2014 | Finkelstein et al. | |
| 8,909,655 B1 * | 12/2014 | McDonnell | G06F 16/29 |
| | | | 707/751 |
| 8,972,388 B1 | 3/2015 | Finkelstein et al. | |
| 9,449,052 B1 | 9/2016 | Rivard et al. | |
| 2003/0105744 A1 | 6/2003 | McKeeth | |
| 2004/0236736 A1 | 11/2004 | Whitman et al. | |
| 2005/0234953 A1 * | 10/2005 | Zhang | G06F 16/3346 |
| 2006/0248078 A1 | 11/2006 | Gross et al. | |
| 2007/0050339 A1 | 3/2007 | Kasperski et al. | |
| 2007/0168344 A1 | 7/2007 | Brinson et al. | |
| 2008/0294619 A1 | 11/2008 | Hamilton et al. | |
| 2009/0106224 A1 * | 4/2009 | Roulland | G06F 16/3325 |
| 2009/0299998 A1 * | 12/2009 | Kim | G06F 16/951 |
| 2010/0223125 A1 | 9/2010 | Spitkovsky | |
| 2011/0093488 A1 | 4/2011 | Amacker et al. | |
| 2011/0307469 A1 | 12/2011 | Ghosh et al. | |
| 2012/0047025 A1 * | 2/2012 | Strohman | G06F 16/9535 |
| | | | 705/14.71 |
| 2012/0095980 A1 | 4/2012 | Elyada | |
| 2012/0166438 A1 | 6/2012 | Wu et al. | |
| 2012/0265756 A1 | 10/2012 | Ryan | |
| 2013/0031088 A1 | 1/2013 | Srikrishna et al. | |
| 2013/0103764 A1 * | 4/2013 | Verkasalo | G06N 20/00 |
| | | | 709/204 |
| 2014/0019460 A1 | 1/2014 | Sambrani et al. | |
| 2014/0188861 A1 | 7/2014 | Angelo et al. | |
| 2014/0365448 A1 | 12/2014 | Keller et al. | |
| 2015/0012519 A1 | 1/2015 | He et al. | |
| 2015/0073871 A1 | 3/2015 | Hu et al. | |
| 2015/0154197 A1 | 6/2015 | Lightner et al. | |
| 2015/0161239 A1 | 6/2015 | Stepinski et al. | |
| 2015/0169563 A1 | 6/2015 | Chen et al. | |
| 2015/0178278 A1 | 6/2015 | Finkelstein et al. | |
| 2015/0317317 A1 | 11/2015 | Deng et al. | |
| 2016/0055259 A1 | 2/2016 | Ghanekar et al. | |
| 2016/0070705 A1 | 3/2016 | Chevalier et al. | |
| 2016/0188702 A1 * | 6/2016 | Lee-Goldman | G06F 16/3322 |
| | | | 707/749 |
| 2017/0139954 A1 | 5/2017 | Mei et al. | |
| 2017/0140006 A1 | 5/2017 | Yang | |
| 2018/0039638 A1 | 2/2018 | Krivokon et al. | |

FOREIGN PATENT DOCUMENTS

| | | |
|---|---|---|
| RU | 2015106797 A | 9/2016 |
| WO | 2011160204 A1 | 12/2011 |

OTHER PUBLICATIONS

English Abstract for CN106294868 retrieved on Espacenet on May 9, 2018.

* cited by examiner

METHOD OF AND SYSTEM FOR RECOMMENDING FRESH SEARCH QUERY SUGGESTIONS ON SEARCH ENGINE

CROSS-REFERENCE

The present application claims priority to Russian Patent Application No. 2018118353, entitled "Method Of And System For Recommending Fresh Search Query Suggestions On Search Engine", filed May 18, 2018, the entirety of which is incorporated herein by reference.

FIELD

The present technology relates to search engines in general and, more specifically, to a method and a system for recommending fresh search query suggestions on a search engine.

BACKGROUND

Various global or local communication networks (the Internet, the World Wide Web, local area networks and the like) offer a user a vast amount of information. The information includes a multitude of contextual topics, such as but not limited to, news and current affairs, maps, company information, financial information and resources, traffic information, games and entertainment related information. Users use a variety of client devices (desktop, laptop, notebook, smartphone, tablets and the like) to have access to rich content (like images, audio, video, animation, and other multimedia content from such networks).

Generally speaking, a given user can access a resource on the communication network by two principle means. The given user can access a particular resource directly, either by typing an address of the resource (typically an URL or Universal Resource Locator, such as ≤www.webpage.com≥) or by clicking a link in an electronic message or in another web resource. Alternatively, the given user may conduct a search using a search engine to locate a resource of interest. The latter is particularly suitable in those circumstances, where the given user knows a topic of interest, but does not know the exact address of the resource she is interested in.

When the given user runs a web search using the search engine, he or she generally has two priorities. He or she wants the search engine to locate the most relevant results and he or she wants the results relatively quickly. To at least partially address these concerns, it is known to present the user using a search engine with query suggestions, also known as "suggests". For example, in response to a user typing a search query "Molly" into the Google™ search engine, the user gets a list of suggests in a drop down menu, namely "Molly Ringwald", "Molly Maid", etc. The general idea behind the suggests is to enable a more user-friendly search experience and to assist the user in exploring a subject of interest. For example, the user may not know exactly what query will provide the information he or she wants; search suggestions can help the user to find desired or related information. The user then can browse the search results and select a link that he or she is desirous of perusing.

Thus, in order to assist the person conducting the search, a search engine can suggest additional queries to the searcher. There are a variety of technologies the search engine can use to identify the additional queries, and each of these technologies will typically result in a large set of queries that the engine can potentially suggest. However, search engines may not necessarily suggest queries about subjects or events that became popular in a short period of time, and that may be of interest to users of the search engine.

United States Patent Application Publication No. 2015/0317317 A1 published on Nov. 5, 2015 to Yahoo! Inc. and titled "Method and system for providing query suggestions including entities" teaches methods, systems and programming for providing query suggestions including entities. In one example, a prefix of a search query is first received. A plurality of query suggestions are then identified based on the prefix of the query. The plurality of query suggestions include at least one entity. Scores of each of the plurality of query suggestions are computed using a first model. The first model includes an adjustable parameter used for computing the score of the at least one entity. The plurality of question suggestions are ranked based, at least in part, on the scores.

United States Patent Application Publication No. 2015/0154197 A1 published on Jun. 4, 2015 to Qbase LLC and titled "Method for obtaining search suggestions from fuzzy score matching and population frequencies" teaches a method for obtaining and providing search suggestions using entity co-occurrence. The method may be employed in any search system that may include at least one search engine, one or more databases including entity co-occurrence knowledge and trends co-occurrence knowledge. The method may extract and disambiguate entities from search queries by using an entity and trends co-occurrence knowledge in one or more database. Subsequently, a list of search suggestion may be provided by each database, then by comparing the score of each search suggestion, a new list of suggestion may be built based on the individual and/or overall score of each search suggestion. Based on the user's selection of the suggestions, the trends co-occurrence knowledgebase can be updated, providing a means of on-the-fly learning, which improves the search relevancy and accuracy.

SUMMARY

Developer(s) of the present technology have appreciated at least one technical problem associated with the prior art approaches.

More precisely, developer(s) of the present technology have appreciated that some prior art approaches recommend suggests based on statistical data of queries entered by users, but may not be capable of recommending—in real-time or near real-time—fresh queries that became popular in a short period of time and that users of the search engine may be looking for. This can be due, for example, to the way query suggestions algorithms rank suggests. Typically, these algorithm use past click through data and such data may be missing or is only partially available for fresh suggests. Thus, conventional systems for query suggestions generations may rank such fresh suggest as being non-relevant or not relevant enough and may not use them in the suggestions presented to the user.

As an illustrative non-limiting example, a person named John Doe may have won a $1 billion jackpot at the lottery, which may be headline news since it is the biggest prize ever won at the lottery. Users may want to learn more about John Doe the lottery winner, however, with reference to FIG. 1, a user typing a portion of a query "John Doe" in an omnibox 35 of a search engine 235 in a web browser 30 on a client device may receive different suggests, such as "John Doe mayor of New York City", "John Douglas", "John does maths on monday wednesday thursday and friday", but may not receive any suggestions related to John Doe the lottery winner and partially equivalent search terms, even if it is growing in popularity, because queries such as "John Doe mayor of New York City", "John Douglas", "John does maths on monday wednesday thursday and friday" have been ranked by the search engine 235 as being more historically popular search terms over a longer period of time based on factors such as a number of submissions, a number of selections, and having more user interactions with search results provided in response to these queries, in comparison to a more recent query such as "John Doe lottery winner", or other equivalent or at least partially equivalent search terms.

Consequently, developer(s) of the present technology had a desire to address such problems.

Thus, embodiments of the present technology are directed to a method and a system for recommending fresh search query suggestions on a search engine.

According to first broad aspect of the present technology, there is provided a computer-implemented method for recommending fresh search query suggestions in real-time by a search engine, the search engine being executed by a server, the server being connected to a search log database, the method being executed by the server, the method comprising: receiving, by the server, an indication of at least a portion of a given search query from a user of an electronic device connected to the server, the indication of the at least portion of the given search query having at least a portion of at least one search term, selecting, by the server from the search log database, based on the indication, a set of query suggestions as search query completion recommendations that are associated with the at least one search term, each respective query suggestion of the set of query suggestions being associated with a respective frequency of past use, the respective frequency being of a first scale, acquiring, by the server from the search log database, a set of fresh search query suggestion candidates, each respective fresh search query suggestion candidate being a respective recent search query having been submitted by a respective plurality of users to the search engine, each respective fresh search query suggestion candidate being associated with a respective frequency of past use, the respective frequency being of a second scale, scaling, by the server, each respective query frequency of the second scale to obtain a respective associated query frequency of the first scale, selecting, by the server, a set of fresh query suggestions from the fresh search query suggestion candidates as search query completion recommendations based on the indication of the at least portion of the given search query, merging, by the server, the set of query suggestions and the set of fresh query suggestions to generate an amalgamated query suggestions set, and generating, by the server, at least a subset of ranked query suggestions based on the amalgamated query suggestions set, a given query suggestion of the subset of ranked query suggestions being one of a fresh query suggestion and a query suggestion, the subset of ranked query suggestions for displaying on the electronic device.

In some implementations, the at least subset of ranked query suggestions has been generated from a set of ranked query suggestions, and prior to the generating, the method further comprises: ranking, by the server, the amalgamated query suggestions set based on the associated respective frequency of the first scale to obtain the set of ranked query suggestions.

In some implementations, the search log database has a plurality of respective recent search queries, and prior to the acquiring, the method further comprises: selecting, by the server, each respective fresh query suggestion candidate of the set of fresh search query suggestion candidates from the plurality of respective recent search queries based on the associated respective frequency of the second scale being above a predetermined frequency threshold.

In some implementations, the selecting each of the respective fresh query suggestion candidates from the plurality of respective recent search queries further comprises: computing, by the server, for each of the respective fresh query suggestion candidates having the associated respective frequency of the second scale above the predetermined frequency threshold, a respective user interaction parameter being indicative of past user interaction s with at least one recent search result obtained in response to the respective recent search query, and the selecting each of the respective fresh query suggestion candidates from the plurality of respective recent search queries is further based on the respective user interaction parameter being above a predetermined user interaction threshold.

In some implementations, the selecting each of the respective fresh query suggestion candidates from the plurality of respective recent search queries further comprises: computing, by the server, for each of the respective fresh query suggestion candidates having the associated respective frequency of the second scale above the predetermined frequency threshold, a respective user-intent parameter being indicative of a probability of the respective recent search query being part of a predetermined search domain, and the selecting each of the respective fresh query suggestion candidates from the plurality of respective recent search queries is further based on the respective user-intent parameter being above a predetermined user-intent parameter threshold.

In some implementations, the scaling each of the respective query frequency of the second scale to obtain the respective associated query frequency of the first scale is based on: an average frequency of search queries submitted by users to the search engine on a given day, an average frequency of search queries submitted by users to the search engine during a given period, and a number of days in a current month.

In some implementations, the selecting each of the respective fresh query suggestion candidates from the plurality of respective recent search queries is further based on a domain name associated with each of the plurality of recent queries in the search log database.

In some implementations, the selecting each of the respective fresh query suggestion candidates from the plurality of respective recent search queries is further based on search terms of the respective recent search query not being part of an inappropriate search term list.

In some implementations, the respective user interaction parameter is a click-through rate (CTR).

In some implementations, the CTR is calculated based on fresh results only.

In some implementations, a given fresh query suggestion candidate is selected only in response to the CTR being based on fresh results being above a predetermined threshold.

In some implementations, the predetermined search domain is a fresh vertical domain.

In some implementations, the method further comprises, prior to the scaling: acquiring, by the server from the search log database, an indication of a fresh document, the acquiring being based on: a resource associated with the indication of the fresh document, and a timestamp associated with the indication of the fresh document, parsing, by the server, the indication of the fresh document to obtain a title of the fresh document, retrieving, by the server, a set of search results associated with the title of the fresh document, acquiring, by the server from the search log database, for each respective search result of the set of search results associated with the title of the fresh document, at least one respective search query having been used by at least one user to access the respective search result, the at least one respective search query being associated with the respective search result, determining, by the server, for each of the at least one respective search queries associated with each of the respective search results, a respective relevance score based on the indication of the fresh document, and adding, by the server, at least one respective search query to the set of fresh search query suggestions candidates based on the relevance score.

In some implementations, the acquiring is further based on: the resource associated with the indication of the fresh document being a predetermined resource of a list of predetermined resources.

In some implementations, the acquiring is further based on: the timestamp associated with the indication of the fresh document being within a predetermined time interval.

In some implementations, the adding the at least one respective search query to the set of fresh search query suggestion candidates is further based on: the respective relevance score being above a predetermined score threshold.

In some implementations, the at least one respective search query includes at least one respective search term, and the determining the respective relevance score is further based on the at least one respective search term.

In some implementations, the set of search results associated with the title of the fresh document has a predetermined number of search results.

In some implementations, the respective relevance score is computed by a ranking algorithm of the search engine.

According to a second broad aspect of the present technology, there is provided a system for recommending fresh search query suggestions in real-time, the system executing a search engine, the system being connected to a search log database, the system comprising: a processor, a non-transitory computer-readable medium comprising instructions, the processor, upon executing the instructions, being configured to: receive an indication of at least a portion of a given search query from a user of an electronic device connected to the system, the indication of the at least portion of the given search query having at least a portion of at least one search term, select, from the search log database, based on the indication, a set of query suggestions as search query completion recommendations that are associated with the at least one search term, each respective query suggestion of the set of query suggestions being associated with a respective frequency of past use, the respective frequency being of a first scale, acquire, from the search log database, a set of fresh search query suggestion candidates, each respective fresh search query suggestion candidate being a respective recent search query having been submitted by a respective plurality of users to the search engine, each respective fresh search query suggestion candidate being associated with a respective frequency of past use, the respective frequency being of a second scale, scale each respective query frequency of the second scale to obtain a respective associated query frequency of the first scale, select a set of fresh query suggestions from the fresh search query suggestion candidates as search query completion recommendations based on the indication of the at least portion of the given search query, merge, the set of query suggestions and the set of fresh query suggestions to generate an amalgamated query suggestions set, and generate at least a subset of ranked query suggestions based on the amalgamated query suggestion set, a given query suggestion of the subset of ranked query suggestions being one of a fresh query suggestion and a query suggestion, the subset of ranked query suggestions for displaying on the electronic device.

In some implementations, the at least subset of ranked query suggestions has been generated from a set of ranked query suggestions, and prior to the generating, the processor is further configured to: rank the amalgamated query suggestions set based on the associated respective frequency of the first scale to obtain the set of ranked query suggestions.

In some implementations, the search log database has a plurality of respective recent search queries, and prior to the acquiring, the processor is further configured to: select each respective fresh query suggestion candidate of the set of fresh search query suggestion candidates from the plurality of respective recent search queries based on the associated respective frequency of the second scale being above a predetermined frequency threshold.

In some implementations, the selecting each of the respective fresh query suggestion candidates from the plurality of respective recent search queries further comprises: computing for each of the respective fresh query suggestion candidates having the associated respective frequency of the second scale above the predetermined frequency threshold, a respective user interaction parameter being indicative of past user interaction s with at least one recent search result obtained in response to the respective recent search query, and the selecting each of the respective fresh query suggestion candidates from the plurality of respective recent search queries is further based on the respective user interaction parameter being above a predetermined user interaction threshold.

In some implementations, the selecting each of the respective fresh query suggestion candidates from the plurality of respective recent search queries further comprises: computing for each of the respective fresh query suggestion candidates having the associated respective frequency of the second scale above the predetermined frequency threshold, a respective user-intent parameter being indicative of a probability of the respective recent search query being part of a predetermined search domain, and the selecting each of the respective fresh query suggestion candidates from the plurality of respective recent search queries is further based on the respective user-intent parameter being above a predetermined user-intent parameter threshold.

In some implementations, the scaling each of the respective query frequency of the second scale to obtain the respective associated query frequency of the first scale is based on:

an average frequency of search queries submitted by users to the search engine on a given day, an average frequency of search queries submitted by users to the search engine during a given period, and a number of days in a current month.

In some implementations, the selecting each of the respective fresh query suggestion candidates from the plurality of respective recent search queries is further based on a domain name associated with each of the plurality of recent queries in the search log database.

In some implementations, the selecting each of the respective fresh query suggestion candidates from the plurality of respective recent search queries is further based on search terms of the respective recent search query not being part of an inappropriate search term list.

In some implementations, the respective user interaction parameter is a click-through rate (CTR).

In some implementations, the CTR is calculated based on fresh results only.

In some implementations, a given fresh query suggestion candidate is selected only in response to the CTR being based on fresh results being above a predetermined threshold In some implementations, the predetermined search domain is a fresh vertical domain.

In some implementations, the processor is further configured to, prior to the scaling: acquire, from the search log database, an indication of a fresh document, the acquiring being based on: a resource associated with the indication of the fresh document, and a timestamp associated with the indication of the fresh document, parse the indication of the fresh document to obtain a title of the fresh document, retrieve a set of search results associated with the title of the fresh document, acquire, from the search log database, for each respective search result of the set of search results associated with the title of the fresh document, at least one respective search query having been used by at least one user to access the respective search result, the at least one respective search query being associated with the respective search result, determine, for each of the at least one respective search queries associated with each of the respective search results, a respective relevance score based on the indication of the fresh document, and add at least one respective search query to the set of fresh search query suggestions candidates based on the relevance score.

In some implementations, the acquiring is further based on: the resource associated with the indication of the fresh document being a predetermined resource of a list of predetermined resources.

In some implementations, the acquiring is further based on: the timestamp associated with the indication of the fresh document being within a predetermined time interval.

In some implementations, the adding the at least one respective search query to the set of fresh search query suggestion candidates is further based on: the respective relevance score being above a predetermined score threshold.

In some implementations, the at least one respective search query includes at least one respective search term, and the determining the respective relevance score is further based on the at least one respective search term.

In some implementations, the set of search results associated with the title of the fresh document has a predetermined number of search results.

In some implementations, the respective relevance score is computed by a ranking algorithm of the search engine.

In the context of the present specification, a "server" is a computer program that is running on appropriate hardware and is capable of receiving requests (e.g. from electronic devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. Thus, some (non-limiting) examples of electronic devices include personal computers (desktops, laptops, netbooks, etc.), smartphones, and tablets, as well as network equipment such as routers, switches, and gateways. It should be noted that a device acting as an electronic device in the present context is not precluded from acting as a server to other electronic devices. The use of the expression "a electronic device" does not preclude multiple electronic devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

In the context of the present technology, a search query $Q_i$ may include one or more search terms $t_1, t_2, \ldots, t_n$ where each search term is an individual word. Thus, a "portion of a search query" may refer to a portion of at least one of the search terms $t_1, t_2, \ldots, t_n$ included in a search query $Q_i(t_1, t_2, \ldots, t_n)$. As a non limiting example, a query "Brad Pitt movies" includes the search terms "Brad", "Pitt", and "movies", and a portion of the query "Brad Pitt movies" may refer to, "Bra", "Brad Pi", "Brad Pitt mo", etc.

In the context of the present technology, a "recent" query or document may refer to a query or a document that has been submitted on a search engine server within a predetermined period of time, which can be, as a non-limiting example: past hour, past four hours, past day, past week or past month.

In the context of the present technology, a "fresh" query or document may refer to a recent query or a recent document which respects specific conditions which will be detailed below.

In the context of the present specification, the expression "plurality of search results" is intended to include a set of more than one search result, where general (e.g., Web) search results and/or vertical search results are integrated together within the set of search results or on a search results page. For example, vertical search results may be integrated into general (e.g., Web) search results within a search results page, or vice-versa, i.e., general search results may be integrated into vertical search results within a search results page. Thus, in some embodiments, general search results and vertical search results may be aggregated and ranked relative to each other. In alternative embodiments, a plurality of search results may include only general search results or only vertical search results, e.g., search results from a particular vertical domain of interest.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
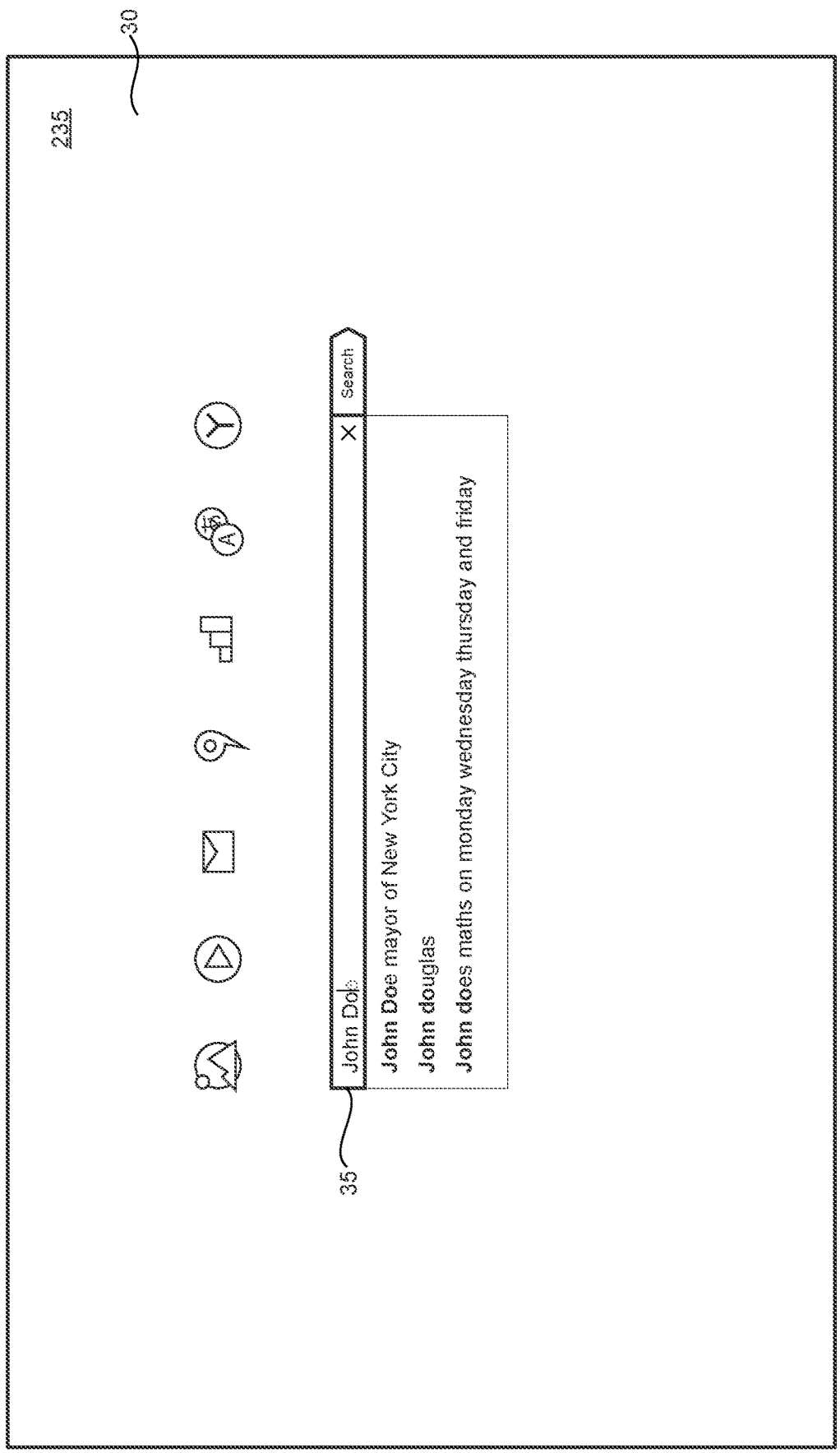
FIG. 1 depicts a search engine interface providing search query suggestions in accordance with implementations of the prior art systems.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU).

Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Figure 2:
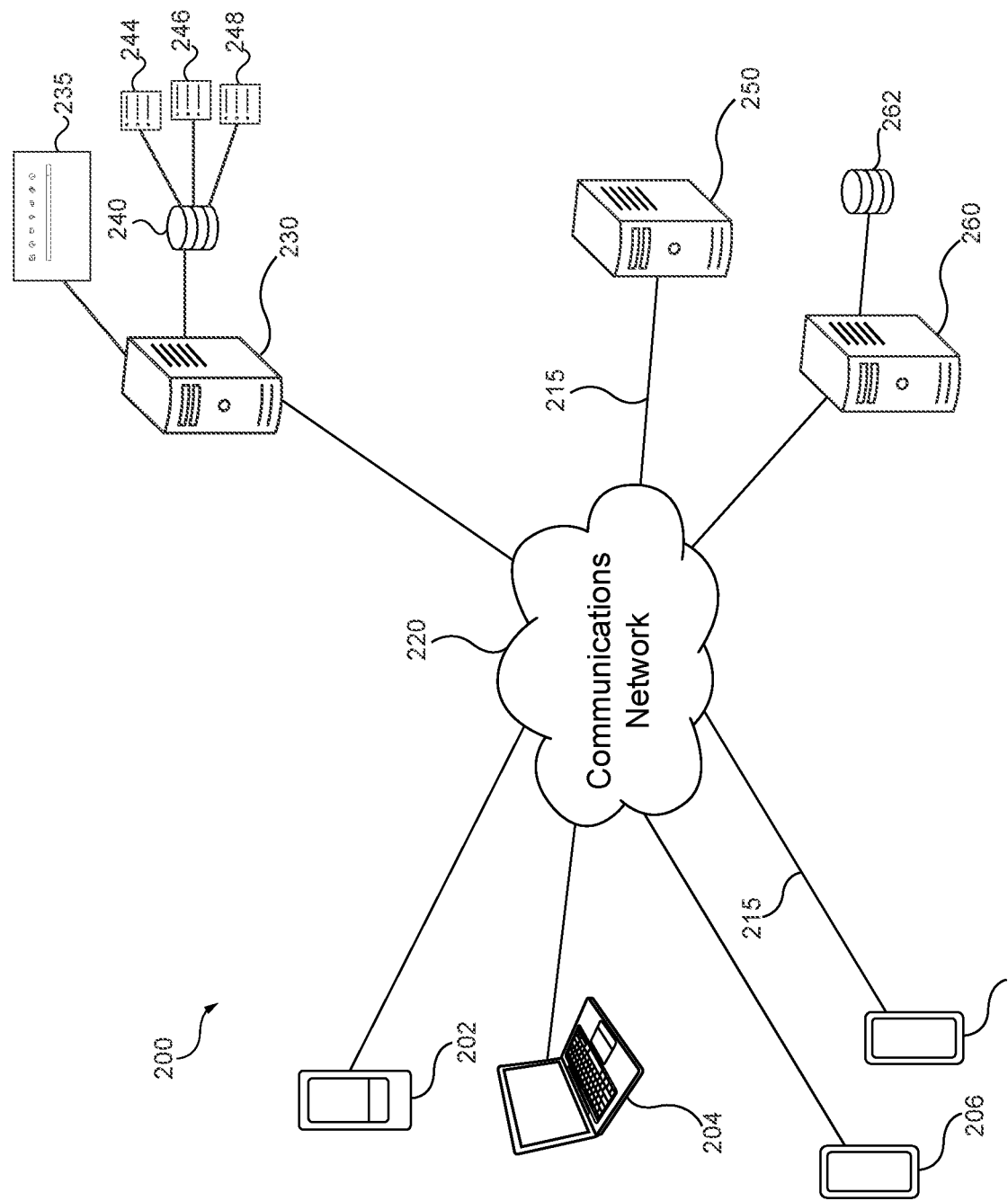
FIG. 2 depicts a diagram of a system implemented in accordance with non-limiting embodiments of the present technology.

With reference to FIG. 2, there is depicted a system 200, the system 200 implemented according to non-limiting embodiments of the present technology. The system 200 comprises a first client device 202, a second client device 204, a third client device 206, and a fourth client device 208 coupled to a communications network 220 via a respective communication link 215 (only one numbered in FIG. 1). The system 200 comprises a search engine server 230, an analytics server 250, and a suggestion server 260 coupled to the communications network 220 via their respective communication link 215. In some embodiments of the present technology, the search engine server 230, the analytics server 250, and the suggestion server 260 may be implemented as a single server.

As an example only, the first client device 202 may be implemented as a smartphone, the second client device 204 may be implemented as a laptop, the third client device 206 may be implemented as a smartphone and the fourth client device 208 may be implemented as a tablet. In some non-limiting embodiments of the present technology, the communications network 220 can be implemented as the Internet. In other embodiments of the present technology, the communications network 220 can be implemented differently, such as any wide-area communications network, local-area communications network, a private communications network and the like.

How the given communication link 215 is implemented is not particularly limited and will depend on how the associated one of the first client device 202, the second client device 204, the third client device 206 and the fourth client device 208 are implemented. Merely as an example and not as a limitation, in those embodiments of the present technology where at least one of the first client device 202, the second client device 204, the third client device 206 and the fourth client device 208 is implemented as a wireless communication device (such as a smart-phone), the associated one of the communication link 215 can be implemented as a wireless communication link (such as but not limited to, a 3G communications network link, a 4G communications network link, a Wireless Fidelity, or WiFi® for short, Bluetooth® and the like). In those examples, where at least one of the first client device 202, the second client device 204, the third client device 206 and the fourth client device 208 are implemented respectively as laptop, smartphone, tablet computer, the associated communication link 215 can be either wireless (such as the Wireless Fidelity, or WiFi® for short, Bluetooth® or the like) or wired (such as an Ethernet based connection).

It should be expressly understood that implementations for the first client device 202, the second client device 204, the third client device 206, the fourth client device 208, the communication link 215 and the communications network 220 are provided for illustration purposes only. As such, those skilled in the art will easily appreciate other specific implementational details for the first client device 202, the second client device 204, the third client device 206, the fourth client device 208 and the communication link 215 and the communications network 220. As such, by no means, examples provided herein above are meant to limit the scope of the present technology.

While only four client devices 202, 204, 206 and 208 are illustrated (all are shown in FIG. 2), it is contemplated that any number of client devices 202, 204, 206 and 208 could be connected to the system 200. It is further contemplated that in some implementations, the number of client devices 202, 204, 206 and 208 included in the system 200 could number in the tens or hundreds of thousands.

Also coupled to the communications network 220 is the aforementioned search engine server 230. The search engine server 230 can be implemented as a conventional computer server. In an example of an embodiment of the present technology, the search engine server 230 can be implemented as a Dell™ PowerEdge™ Server running the Microsoft™ Windows Server™ operating system. Needless to say, the search engine server 230 can be implemented in any other suitable hardware and/or software and/or firmware or a combination thereof. In the depicted non-limiting embodiment of present technology, search engine server 230 is a single server. In alternative non-limiting embodiments of the present technology, the functionality of the search engine server 230 may be distributed and may be implemented via multiple servers. In some embodiments of the present technology, the search engine server 230 is under control and/or management of a search engine operator. Alternatively, the search engine server 230 can be under control and/or management of a service provider.

Generally speaking, the purpose of the search engine server 230 is to (i) execute searches; (ii) provide search query suggestions to users (such as users of the first client device 202, the second client device 204, the third client device 206 and the fourth client device 208); (iii) execute analysis of search results and perform ranking of search results in response to a search request; (iv) group results and compile the search engine result page (SERP) to be outputted to an electronic device (such as one of the first client device 202, the second client device 204, the third client device 206 and the fourth client device 208), the electronic device having been used to submit the search request that resulted in the SERP.

How the search engine server 230 is configured to execute searches is not particularly limited. Those skilled in the art will appreciate several ways and means to execute the search using the search engine server 230 and as such, several structural components of the search engine server 230 will only be described at a high level. The search engine server 230 may maintain a search log database 240.

In some embodiments of the present technology, the search engine server 230 can execute several types of searches via the search engine 235, including but not limited to, a general domain search and a vertical domain search.

The search engine 235 of the search engine server 230 is configured to perform general domain searches, as is known to those skilled in the art. For example, a general domain search is not confined to search a specific category of results but is able to provide all results that best match the search query. Such a general (category-independent) search by the search engine 235 may return search results that include non-category specific digital content as well as category specific digital content, such as images, videos, news, shopping, blogs, books, places, discussions, recipes, tickets, biographical information, patents, stocks, timelines, etc., and other digital content that is closely related and directed toward a certain type of digital content. As an example, a general domain search may be a WWW search. A search performed in a general domain generates a "general search result" or "general search result item." Such general search results are also referred to herein as "web results." Typically, a web result includes a website link and a snippet that summarizes content of the website. A user may select a website link of a web result to navigate to the webpage related to the user search query. The terms "general search result" and "general search result item" are used interchangeably herein, as are the terms "search result" and "search result item."

The search engine 235 of the search engine server 230 is also configured to perform vertical domain searches. For example, a vertical domain may be an information domain containing specialized content, such as content of a single type (e.g., media type, genre of content, topicality, etc.). A vertical domain thus includes a specific subset of a larger set of data, for example, a specific subset of web data. For example, a vertical domain may include specific information such as images, videos, news, shopping, blogs, books, places, discussions, recipes, tickets, biographical information, patents, stocks, timelines, etc. A search performed in a vertical domain generates a "vertical search result" or a "vertical search result item". Such vertical search results are also referred to herein as "verticals" and "vertical results." The terms "vertical search result" and "vertical search result item" are used interchangeably herein.

In some embodiments of the present technology, the search engine 235 may also maintain a "fresh" vertical domain. The fresh vertical domain may include recent documents (i.e. having been updated or indexed by the search engine server 230 within a predetermined period of time from a current hour, day, week, or month) from other vertical domains and/or from the general domain. In other embodiments, the fresh vertical domain may only include a selected subset of recent documents from other vertical domains. In alternative embodiments, the fresh vertical domain may contain recent documents that may not be included in other vertical domains. Even though the fresh vertical domain can be maintained as a separate domain, in alternative non-limiting embodiments of the present technology, information about fresh documents may be stored in a respective vertical domain database or in a general domain database, as the case may be.

The search engine server 230 is also configured to, as is known to those of skill in the art, execute a crawler algorithm—which algorithm causes the search engine server 230 to "crawl" the Internet and index visited web sites into one or more of the index databases, such as the search log database 240.

The search engine 235 of the search engine server 230 is configured to generate a ranked search results list, including the results from the general domain search and the vertical domain search. Multiple algorithms for ranking the search results are known and can be implemented by the search engine 235.

Just as an example and not as a limitation, some of the known techniques for ranking search results by relevancy to the user-submitted search query are based on some or all of: (i) how popular a given search query is in searches; (ii) how many results have been returned; (iii) whether the search query contains any determinative terms (such as "images", "movies", "weather" or the like), (iv) how often a particular search query is typically used with determinative terms by other users; and (v) how often other uses performing a similar search have selected a particular resource or a particular vertical search results when results were presented using the SERP. The search engine server 230 can thus calculate and assign a relevance score (based on, but not limited to, the different criteria listed above) to each search result obtained in response to a user-submitted search query and generate a SERP, where search results are ranked according to their respective relevance scores. In the present embodiment, the search engine server 230 may execute a plurality of machine learning algorithms for ranking documents and/or generate features for ranking documents.

The search engine server 230 typically maintains the above-mentioned search log database 240.

Generally, the search log database 240 may include an index 244, a search query log 246, and a user interaction log 248.

The purpose of the index 244 is to index documents (or indication of documents), such as, but not limited to, web pages, images, videos, Portable Document Format (PDF) documents, Microsoft Word™ documents, Microsoft PowerPoint™ documents, that have been crawled (or discovered) by the crawler of the search engine server 230. In some embodiments of the present technology, the index 244 is maintained in a form of posting lists. As such, when a user of one of the first client device 202, the second client device 204, the third client device 206, and the fourth client device 208 inputs a search query and performs a search on the search engine server 230, the search engine server 230 analyzes the index 244 and retrieves documents that contain terms of the query, and ranks them according to a ranking algorithm.

The purpose of the search query log 246 is to maintain a log of searches submitted on the search engine 235. More specifically, the search query log 246 may maintain a list of queries, each respective query of the list having respective search terms, the associated documents that were listed by the search engine server 230 in response to the respective search query, a number of submissions over time of the respective query (referred to as a frequency of past use herein below), and may also contain a list of users (or group of users) identified by anonymous IDs (or without an ID altogether) and the respective documents they have clicked on after submitting the respective search query. In some embodiments, the search query log 246 may be updated every time a new search is performed on the search engine server 230. In other embodiments, the search query log 246 may be updated at predetermined times. In some embodiments, there may be a plurality of copies of the search query log 246, each corresponding to the search query log 246 at different points in time.

The manner in which the user interaction log 248 is structured is not limited. The user interaction log 248 may be linked to the search query log 246, and list user interaction parameters as tracked by the analytics server 250 after a user has submitted a search query and clicked on one or more documents in a SERP on the search engine 235. As a non-limiting example, the user interaction log 248 may maintain: (i) a reference to a respective document or an indication thereof, which may be identified, as a non-limiting example, by an ID number or an URL; (ii) a respective list of queries, where each respective query of the list of respective queries is associated with the respective document, and where each of the respective queries has been used by one or more users to access the respective document; and (iii) a respective plurality of user interaction parameters per query (if the document was interacted with), which are indicative of user interaction s with the respective document by users having submitted the respective query of the list of queries. The user interaction log 248 may further include respective timestamps associated with the respective user interaction s, and other statistical data. In some embodiments, the search query log 246 and the user interaction log 248 may be implemented as a single log.

Generally speaking, data from the search log database 240 (including data from the user interaction log 248) may be acquired or received by at least one of the search engine server 230, the analytics server 250, and the suggestion server 260 in a synchronous manner (i.e. at predetermined time intervals), or in an asynchronous manner (e.g. upon receipt of an indication).

In the present embodiment, the user interaction parameters of the user interaction log 248 may generally be tracked and compiled by the analytics server 250.

Also coupled to the communications network 220 is the above-mentioned analytics server 250. The analytics server 250 can be implemented as a conventional computer server. In an example of an embodiment of the present technology, the analytics server 250 can be implemented as a Dell™ PowerEdge™ Server running the Microsoft™ Windows Server™ operating system. Needless to say, the analytics server 250 can be implemented in any other suitable hardware and/or software and/or firmware or a combination thereof. In the depicted non-limiting embodiment of present technology, the analytics server 250 is a single server. In alternative non-limiting embodiments of the present technology, the functionality of the analytics server 250 may be distributed and may be implemented via multiple servers. In other embodiments, the functionality of the analytics server 250 may be implemented completely or partially by the search engine server 230. In some embodiments of the present technology, the analytics server 250 is under control and/or management of a search engine operator. Alternatively, the analytics server 250 can be under control and/or management of another service provider.

Generally speaking, the purpose of the analytics server 250 is to track user interactions with the search engine 235 of the search engine server 230, such as search queries and terms entered by users, and documents subsequently accessed by the users. The analytics server 250 may track user interactions (such as, for example, click-through data) when users perform general domain searches and vertical domain searches on the search engine 235 of the search engine server 230. The user interactions may be tracked, by the analytics server 250, in a form of user interaction parameters.

Non-limiting examples of user interaction parameters tracked or computed by the analytics server 250 include:

Loss/Win: was the document clicked in response to the search query or not.

Dwell time: time a user spends on a document before returning to the SERP.

Long/short click: was the user interaction with the document long or short, compared to the user interaction with other documents on the SERP.

Click-through rate (CTR): Number of clicks on an element divided by the number of times the element is shown (impressions).

Naturally, the above list is non-exhaustive and may include other types of user interaction parameters without departing from the scope of the present technology.

The analytics server 250 may transmit the tracked user interaction parameters to the search engine server 230 such that it can be stored in the search query log 246 and the user interaction log 248 of the search log database 240. In some embodiments, the analytics server 250 may store the user interaction parameters and associated search results locally in a user interaction log (not depicted). In alternative non-limiting embodiments of the present technology, the functionality of the analytics server 250 and the search engine server 230 can be implemented by a single server.

Also coupled to the communications network is the above-mentioned suggestion server 260. The suggestion server 260 can be implemented as a conventional computer server. In an example of an embodiment of the present technology, the suggestion server 260 can be implemented as a Dell™ PowerEdge™ Server running the Microsoft™ Windows Server™ operating system. Needless to say, the suggestion server 260 can be implemented in any other suitable hardware and/or software and/or firmware or a combination thereof. In the depicted non-limiting embodiment of present technology, the suggestion server 260 is a single server. In alternative non-limiting embodiments of the present technology, the functionality of the suggestion server 260 may be distributed and may be implemented via multiple servers. In the context of the present technology, the suggestion server 260 may implement in part the methods and system described herein. In some embodiments of the present technology, the suggestion server 260 is under control and/or management of a search engine operator. Alternatively, the suggestion server 260 can be under control and/or management of another service provider. The functionality of the suggestion server 260 can also be implemented by the search engine server 230.

Generally speaking, the purpose of the suggestion server 260 is to generate search query suggestions related to a portion of a search query that is entered by a user on an interface of the search engine 235 (without the user having necessarily submitted a search query for processing by the search engine 235). The suggestion server 260 may forward the search query suggestions to the search engine server 230, and the search engine 235 may rank and recommend the search query suggestions as search query completions to the user. In alternative embodiments, the suggestion server 260 may rank the search query suggestions before forwarding them to the search engine server 230. In some embodiments, the functionality of the search engine server 230 and the suggestion server 260 may be implemented in a single server.

For the purpose of the present technology, search query suggestions may be divided into two distinct categories: (i) "old" search query suggestions, and (ii) "fresh" search query suggestions. Old search query suggestions may be thought of as "classic" search query suggestions, which are recommended to users based on factors such as, but not limited to, overall or absolute number of submissions as search queries over time, and interactions of users with SERPs provided in response to those search queries, and the like. Fresh query suggestions or fresh documents may refer respectively to search queries or documents that have been recently entered in the search log database 240 of the search engine server 230, i.e. during a predetermined period of time before a current hour, day, week or month and that satisfy specific conditions which will be detailed herein below. In the context of the present technology, the fresh search query suggestions may be generated by: (i) acquiring recent search queries that respect specific conditions; and (ii) acquiring a fresh document that is responsive to the recent search queries from a predetermined resource. How the fresh search query suggestions are generated will be described in more detail herein below.

The suggestion server 260 may also maintain a suggestion database 262.

The suggestion database 262 may contain one or more of the old search query suggestions and associated parameters, the fresh query suggestions candidates and associated parameters, the fresh query suggestions and associated parameters, and fresh documents and associated parameters, which will be detailed herein below. It should be understood that in some embodiments, the suggestion database 262 is optional, and its functionality may be implemented by the search log database 240 of the search engine server 230 or by another database (not depicted) on other servers (not depicted).

Generally, old search query suggestions and fresh search query suggestions may be combined to obtain a combined or amalgamated set of search query suggestions, which may be ranked to obtain a ranked set, and at least a portion of the ranked set may be subsequently provided as query completion suggestions to users entering a portion of a search query on the search engine 235 of the search engine server 230. In some embodiments, at least a portion of the amalgamated set of search query suggestions may be provided to a user after submission of search query, as a non-limiting example in an area under a search bar on a SERP.

Those skilled in the art will appreciate that there are various techniques available for ranking and/or personalizing search query suggestions. Just as an example and not as a limitation, some of the known techniques for ranking search query suggestions by relevancy are based on some or all of: (i) popularity of a given search query suggestion; (ii) number of results returned for a search query suggestion; (iii) whether the search query suggestion contains any determinative terms (such as "images", "movies", "weather", "YouTube™", and the like); (iv) how often a particular search query suggestion is typically selected or used with determinative terms by other users; and (v) how often other users performing a similar search have selected a particular resource or a particular search results item when results to a particular search query suggestion were presented. Such rankings may or may not be personalized, i.e., they may or may not be based on a user-specific ranking attribute. In some embodiments, such rankings of search query suggestions are based on known, general ranking techniques, and are not user-specific. In other embodiments, rankings of search query suggestions are user-specific, i.e., are based on user-specific general or vertical ranking attributes. User-specific ranking attributes are based on the user's personal information, such as features of the user's search history. It should be understood that any such ranking and/or personalization techniques may be used in the context of the present technology.

For purposes of illustration only, in the examples described herein, search query completion suggestions are referred to as text strings, phrases, or words, however it should be expressly understood that the type of search query completion suggestion generated is not particularly limited. For example, a search query completion suggestion could be an image, an audio recording, a text, etc.

While the present non-limiting embodiments refer to users typing search queries on an interface of the search engine 235 executed by the search engine server 230, it should be expressly understood that the present technology may be implemented on other types of resources, applications and/or interfaces used for information retrieval.

Figure 3:
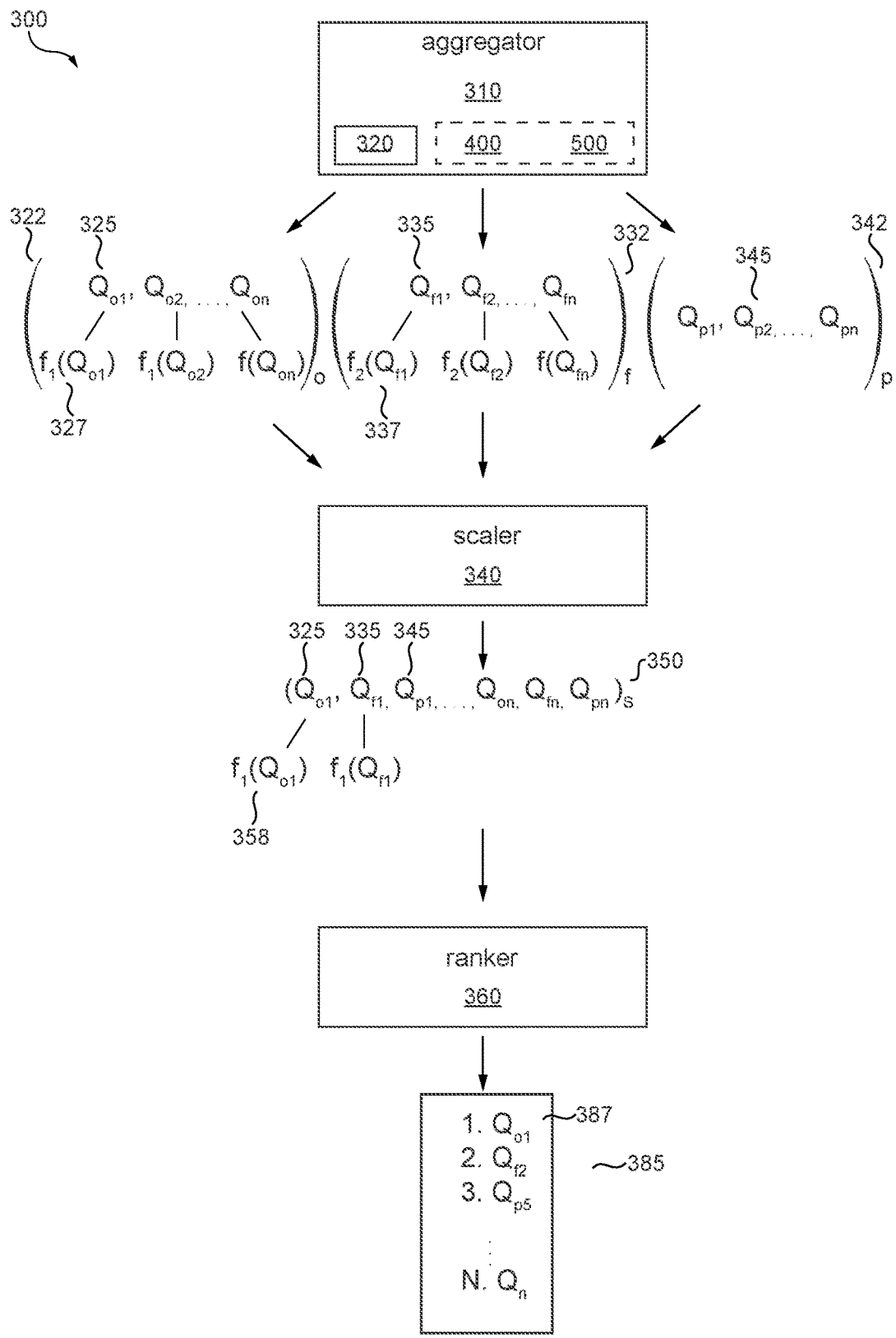
FIG. 3 depicts a schematic diagram of a search query suggestion system in accordance with non-limiting embodiments of the present technology.

With reference to FIG. 3, a high-level schematic diagram of a search query suggestion system 300 is depicted in accordance with non-limiting embodiments of the present technology.

The search query suggestion system 300 may be executed by the suggestion server 260 and the search engine server 230. In alternative embodiments, the search query suggestion system 300 may be executed only by the suggestion server 260. In other embodiments, where the functionality of the suggestion server 260 is implemented by the search engine server 230, the search query suggestion system 300 may be executed by the search engine server 230.

Generally speaking, the purpose of the search query suggestion system 300 is to provide search query completion suggestions or recommendations that include at least one fresh search query suggestion related to at least a portion of a search query that is being typed by a user (such as a user of one of the first client device 202, the second client device 204, the third client device 206 and the fourth client device 208) on the search engine 235, but that may not be provided as a completion suggestions by some prior art systems, as explained above.

The search query suggestion system 300 includes an aggregator 310, a scaler 340, and a ranker 360. As stated above, the ranker 360 may be executed by the search engine server 230.

Generally speaking, the purpose of the aggregator 310 is to query the search log database 240 to acquire and output (i) a set of old query suggestions 322; (ii) a first set of fresh search query suggestions candidates 332; and (iii) a second set of fresh search query suggestions candidates 342. In the embodiment illustrated herein, the aggregator 310 executes an old query aggregator 320 for generating the set of old query suggestions 322, a first fresh query candidate aggregator 400 for generating the first set of fresh search query suggestions candidates 332, and a second fresh query candidate aggregator 500 for generating the second set of fresh search query suggestions candidates 342. As such, the first set of fresh search query suggestions candidates 332 generated by the first fresh query candidate aggregator 400 may be thought of as a first approach for generating fresh search query candidates, and the second set of fresh search query suggestions candidates 342 generated by the second fresh query candidate aggregator 500 may be thought of as a complementary approach for polishing or refining search query suggestions candidates in the first set of fresh search query suggestions candidates 332. Thus, in some embodiments, the first fresh query candidate aggregator 400 and the second fresh query candidate aggregator 500 may be a single fresh query candidate aggregator, and the first set of fresh search query suggestions candidates 332 and the second set of fresh search query suggestions candidates 342 may be a single set of fresh search query suggestions candidates. In alternative embodiments, the second set of fresh search query suggestions candidates 342 may be generated independently from the second set of fresh search query suggestions candidates 342 by the second fresh query candidate aggregator 500.

The aggregator 310 may generally acquire each of the set of old query suggestions 322, the first set of fresh search query suggestions candidates 332, and the second set of fresh search query suggestions candidates 342 asynchronously, upon receiving an indication from the search engine 235 of the search engine server 230. In alternative embodiments, at least one of the set of old query suggestions 322, the first set of fresh search query suggestions candidates 332, the second set of fresh search query suggestions candidates 342 may be acquired at predetermined intervals of time, and saved in the suggestion database 262.

The purpose of the old query aggregator 320 is to acquire, from the search log database 240, search query suggestions related to a portion of a search query that is being entered by a user on the interface of the search engine 235, to output the set of old query suggestions 322.

As explained above, the manner in which the old query aggregator 320 retrieves the set of old query suggestions 322 is not particularly limited and may be based on one or more of: (i) frequency of past use or statistical popularity of a given search query suggestion based at least partially on past related search queries in the search query log 246 and user interaction log 248; (ii) user-specific popularity of the given search query suggestion in the user interaction log 248; (iii) how often a particular search query suggestion is typically searched along with the search query; and (iv) other auxiliary information associated with past searches by other (or the same) user, that may be obtained from the search log database 240.

The old query aggregator 320 may then output the set of old query suggestions 322, where each respective old query suggestion 325 is associated with a respective frequency of past use of a first scale 327. As used herein, a scale associated with a frequency of past use is indicative or refers to a predetermined interval of time associated with the frequency of past use over which the distribution of the number of submissions was computed. As a non-limiting example, a frequency of past use of the first scale (such as the frequency of past use of the first scale 327 associated with the respective old query suggestion 325) may refer to a number of submissions of the respective query over an interval of one month.

Figure 4:
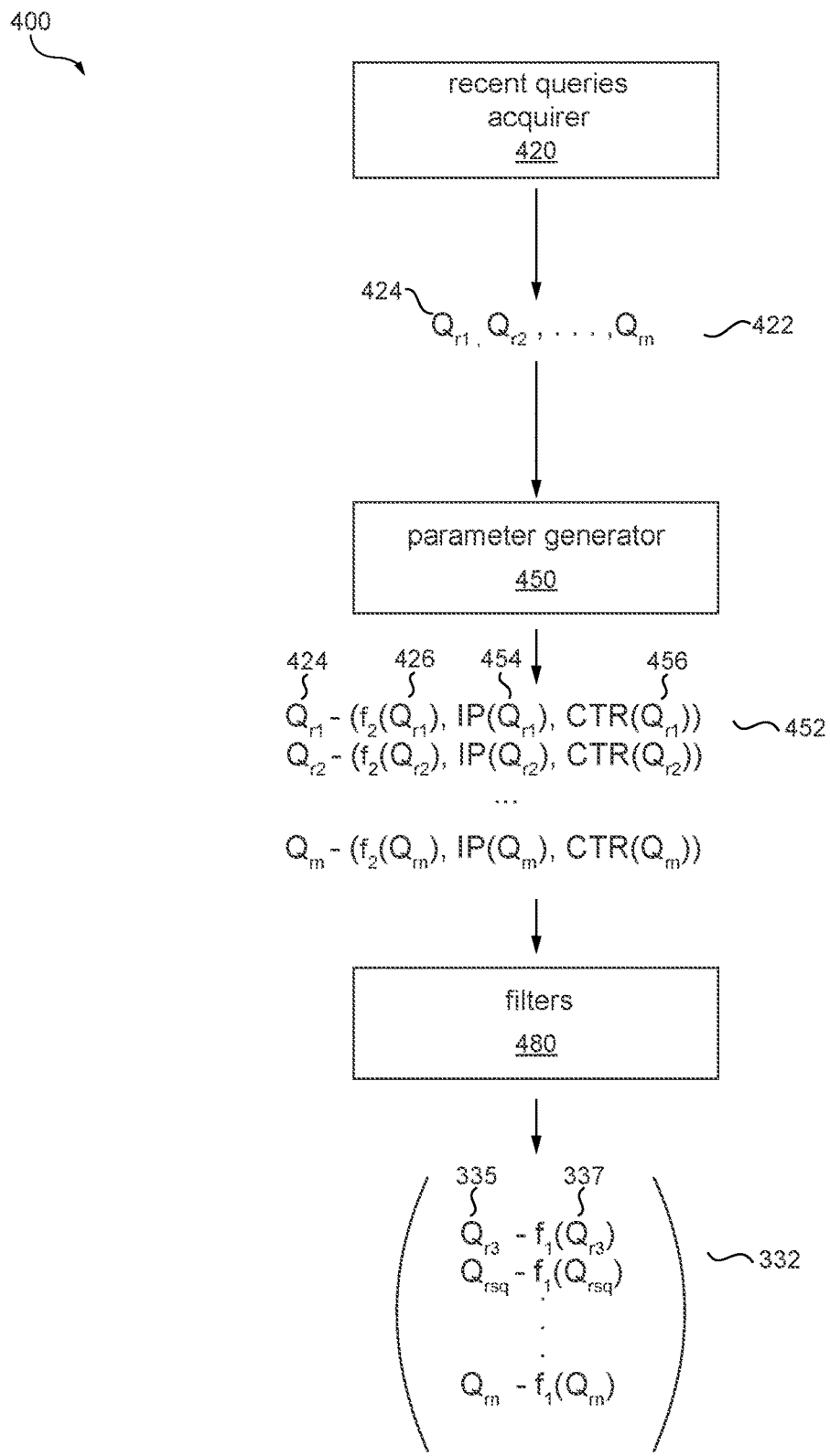
FIG. 4 depicts a schematic diagram of a first fresh query candidate aggregator of the search query suggestion system of FIG. 3 in accordance with non-limiting embodiments of the present technology.

Reference is now made to FIG. 4, where the first fresh query candidate aggregator 400 of the aggregator 310 will be described in accordance with non-limiting embodiments of the present technology.

The first fresh query candidate aggregator 400 includes a recent queries acquirer 420, a parameter generator 450 and a plurality of filters 480.

Generally speaking, the purpose of the first fresh query candidate aggregator 400 is to output the first set of fresh search query suggestions candidates 332, which includes recent search queries that have been growing in popularity or became popular among users of the search engine 235 in a relatively short period of time before the current hour, day, or week, and that have passed the plurality of filters 480. As such, queries in the first set of fresh search query suggestions candidates 332 are not generally be included among the set of old query suggestions 322 due to the respective different scales associated with queries in the first set of fresh search query suggestions candidates 332 and the set of old query suggestions 322, which will be explained in more detail herein below.

The recent queries acquirer 420 may query the search query log 246 of the search log database 240 to output a plurality of recent queries 422. In some embodiments, the recent queries acquirer 420 may output the plurality of recent queries 422 upon receiving an indication of at least a portion of search query (which may be a portion of a search term of the search query) being typed by a user on a interface of the search engine 235, and where the plurality of recent queries 422 relate to the portion of the search query being typed. In other embodiments, the queries acquirer 420 may output the plurality of recent queries 422 at predetermined intervals of time without receiving an indication for completion of at least a portion of a search query, and the respective recent query 424 included in the plurality of recent queries 422 may be acquired by monitoring all recent search queries, which may or may not be interrelated.

A respective recent query 424 of the plurality of recent queries 422 may be a search query having been submitted by at least one user on the search engine 235 of the search engine server 230 during a predetermined period of time before a current hour, day, week or month, and having been logged in the search query log 246. As such, the respective recent query 424 is not necessarily a popular query having a high number of submissions and user interaction s with documents in a SERP provided in response to the query, but simply a search query that has been submitted on the search engine 235 by at least one user during the predetermined period of time. In some embodiments, to be indexed in the search query log 246 of the search log database 240, a search query may still need to have a total number of submissions over a predetermined threshold.

Generally speaking, the recent queries acquirer 420 may acquire recent queries based on a language of the portion of the query typed by the user on the interface of the search engine 235, and a domain name of the search engine 235 on which the portion of the query is being typed, such as, but not limited to, .com, .ru, .kz, .com.tr, and the like. In embodiments where the plurality of recent queries 422 are acquired at predetermined intervals of time, the plurality of recent queries 422 may still be acquired based on at least one of a language of each of the respective recent queries 425 and a domain name of the search engine 235 where each of the respective recent queries 425 was submitted.

Additionally or optionally, the recent queries acquirer 420 may apply an inappropriate term filter (not depicted) to verify that one or more terms of each respective recent query 424 of the plurality of recent queries 422 are not part of a list of inappropriate or forbidden words, which may include words relating to sensitive content, violence, drugs, nudity, pornography, and the like. The filters may be pre-set by an operator of the search engine.

Each respective recent query 424 of the plurality of recent queries 422 may then be received at the parameter generator 450.

Generally speaking, the purpose of the parameter generator 450 is to generate, for each respective recent query 424 of the plurality of recent queries 422, a respective plurality of parameters 452. The respective plurality of parameters 452 may then be used to determine, via the plurality of filters 480, if the respective recent query 424 is part of the first set of fresh search query suggestions candidates 332.

The respective plurality of parameters 452 includes a respective frequency of past use of the second scale 426, a respective user-intent parameter 454, and a respective user interaction parameter 456.

Frequency of Past Use

The respective frequency of past use of the second scale 426 associated with a respective recent query 424 may be a respective distribution of the number of submissions of the respective recent query 424 on the search engine 235 over a predetermined interval of time. The predetermined interval of time over which the frequency of past use of the respective recent search query 424 is computed is referred to as being of the second scale, since information associated with the respective recent search query 424 (i.e. number of submission and user interaction s with SERPs in response to the respective recent query 424) may only be available for that predetermined period of time, which may be different from the predetermined period of time over which the respective frequency of past use of the first scale 327 associated with the respective old query suggestion 325 was computed. As a non-limiting example, the respective frequency of past use of the second scale 426 may be the number of submissions of the respective recent search query 424 over an interval of 4 hours, such as between 4:00 PM and 8:00 PM on a specific day, thus, the first scale of the respective frequency of past use of the first scale 327 associated with the respective old query suggestion 325 may be one month, and the second scale of the respective frequency of past use of the second scale 426 associated with a respective recent query 424 may be four hours. The manner in which the number of submissions of a recent search query over the predetermined interval of time is represented in the search query log 246 is not limited: as an example, a submission may be entered in the search query log 246 at the specific time it is received at the search engine 235, or submissions may be entered in the search query log 246 for specific sub-intervals, e.g. the search query log 246 may log information about the number of query submissions for every 10 minutes, and the parameter generator 450 may aggregate the number of submissions for the predetermined interval of 4 hours from the search query log 246 to obtain the respective frequency of past use of the second scale 426. In some embodiments, the respective frequency of past use of the second scale 426 may be computed and/or updated by the analytics server 250 in real-time, saved in the search query log 246 and retrieved by the parameter generator 450.

The parameter generator 450 may thus output, for each respective recent query 424 of the plurality of recent queries 422, a respective frequency of past use of the second scale 426.

User-Intent Parameter

The parameter generator 450 may generate a respective user-intent parameter 454 associated with the respective recent query 424. The purpose of the respective user-intent parameter 454 is to quantify an intent of a user submitting the respective recent query 424 using an interface of the search engine 235, and more precisely, in the context of the present technology, to predict if the user is interested in examining recent documents in a SERP provided in response to the recent query 424 at a specific moment in time. Thus, the respective user-intent parameter 454 may be interpreted as being a probability of the user being desirous in interacting with a recent document in the fresh vertical domain in a SERP provided by the search engine 235 in response to the respective recent query 424.

The respective user-intent parameter 454 may be computed based on the respective frequency of past use of the second scale 426, and from information obtained from the search query log 246, and the user interaction log 248 of the search log database 240.

In one embodiment of the present technology, the respective user-intent parameter 454 may be computed via a click model generated by a machine learning algorithm (MLA). Generally, the search engine server 230 may use a click model for modeling one or more of: user behavior, understanding user satisfaction, predicting click probabilities and document relevance. A click model generally uses a set of variables to describe user behavior during one or more sessions, such as positions of the documents in the SERP obtained in response to a query, if a document was examined or not, if a document was clicked on or not, a relevance of the document, a distance between documents of the SERP, transitions between documents, and like. The click model may be trained on data from the user interaction log 248 and the search query log 246, and may then be evaluated by using various evaluation metrics, which are known in the art. Thus, based on the data from the user interaction log 248 and the search query log 246, such as the user interaction s with recent documents from the fresh vertical domain obtained in response to the respective recent query 424 or related queries, tracked by the analytics server 250 during the predetermined period of time, and the different variables listed above, the parameter generator 450 may compute the respective user-intent parameter 454 via the click model implemented by the search engine server 230.

As a non-limiting example, during the training phase of the click model, the respective user-intent parameter 454 may be given a random value within a range, the respective recent query 424 associated with the respective user-intent parameter 454 may be suggested to a sample of users of the search engine 235, and the respective user-intent parameter 454 may then be adjusted iteratively based on obtained statistics (e.g. a number of users who have selected respective recent query 424 and subsequent user interaction s with a SERP provided in response to the respective recent query 424).

In some embodiments of the present technology, as an example when a query has a plurality of intents, the parameter generator 450 may determine a plurality of user-intent parameters, each associated with a respective vertical domain, and assign a respective weight to each of the plurality of user-intent parameters to allow comparison and/or selection of the user-intent parameters to determine the respective user-intent parameter 454. Additionally or alternatively, the parameter generator 450 may compute a weighted sum of the plurality of user-intents parameters to obtain the respective user-intent parameter 454.

Generally, the respective user-intent parameter 454 for the respective recent query 424 may be computed in real-time, i.e. upon receiving an indication for a query suggestion completion. In some embodiments, the respective user-intent parameter 454 may be computed at predetermined intervals of time, e.g. every 30 minutes, saved in the suggestion database 262 and a most recent version may be retrieved upon receiving an indication for a query suggestion completion. As it may be understood, the respective user-intent parameter 454 may change over time based on different factors such as a type of the query, general activity on the search engine 235, freshness of the recent documents obtained in response to the respective recent query 424, number of user interactions with search results in response to the query, and the like.

Further, the respective user-intent parameter 454 may be adjusted or tuned by obtaining feedback (e.g. user interactions with SERPs in response to suggesting the respective recent query 424) based on one or more previous user-intent parameters computed for the same respective recent search query 424.

In some embodiments of the present technology, the respective user-intent parameter 454 may be further based on user-specific attributes of the user(s) submitting the portion of the query related to the respective recent search query 424. The user-specific attributes may, as an example, be taken into account in the previously discussed click model. As a non-limiting example, based on a search history of a user or group of users, who has searched for and accessed a number of documents related to a specific vertical domain, such as movies, the parameter generator 450 may attribute a weight to the movies domain vertical when determining the respective user-intent parameter 454, to account for the general interest of the user or group of users in movies.

In some embodiments, the analysis may not be limited to the search log database 240 of the search engine server 230, and the respective user-intent parameter 454 may be computed, at least partially, based on information acquired from other sources. As a non-limiting example, information for determining a respective user-intent parameter 454 may be acquired via application program interfaces (API) of social networks, such as Facebook™, Twitter™, or VKontakte™, or from other sources, where statistical information about public content may be available.

The parameter generator 450 may thus output, for each respective recent query 424 of the plurality of recent queries 422, a respective user-intent parameter 454.

User Interaction Parameter

The parameter generator 450 may generate a respective user interaction parameter 456 associated with the respective recent query 424, the respective user interaction parameter 456 being indicative of user interactions with at least one recent search result obtained in response to the respective recent search query 424.

The manner in which the respective user interaction parameter 456 is computed is not limited, and the respective user interaction parameter may be, as a non-limiting example, a click-through rate (CTR), which is a ratio of users having interacted with one or more recent documents on a SERP provided in response to the respective recent search query 424, to the total number of times the recent document was shown (without user interactions) on the SERP (which may be a vertical domain SERP, such as the fresh vertical domain, or a general domain SERP) during the predetermined interval of time. As a non-limiting example, if a SERP obtained in response to the respective recent query 424 has a total of ten documents, of which two are recent documents (i.e. with timestamps being within the predetermined interval of time), and the SERP was shown 5000 times, but only 1000 users clicked on a first recent document, and only 600 users clicked on a second recent document, the CTR for the first recent document may be determined to be: 1000/5000=0.20, and the CTR for the second recent document may be determined to be 600/5000=0.12, the total CTR associated with the respective recent query 424 may be determined to be 0.12+0.20=0.32. As it may be understood, other types of user interaction parameters quantifying user interaction s with recent documents associated with the respective recent search query 424 may be used or computed. In an alternative embodiment, the CTR associated with the respective recent query 424 may be computed only for a fresh document (i.e. a recent document having a timestamp within a predetermined period of time and originating from a predetermined resource included in list of predetermined resources) acquired by the second fresh query candidate aggregator 500, which will be described in more detail herein below.

Each respective recent search query 424 may thus be associated with a respective plurality of parameters 452, the respective plurality of parameters 452 including the respective frequency of past use of the second scale 426, the respective user-intent parameter 454, and the respective user interaction parameter 456.

Each respective recent search query 424 and the associated respective plurality of parameters 452 may be received at the plurality of filters 480.

Generally speaking, the purpose of the plurality of filters 480 is to filter each respective recent query 424 based on the associated respective frequency of past use of the second scale 426, the respective user-intent parameters 454 and the respective user interaction parameter 456, to output the first set of fresh search query suggestions candidates 332.

First, each respective recent query 424 may be filtered based on the associated respective frequency of past use of the second scale 426. The respective frequency of past use of the second scale 426 may allow determining that the respective recent search query 424 is trending, i.e. the respective recent search query 424 has a growing number of submissions on the search engine 235 during the predetermined interval, and may be considered a potential respective first fresh query suggestion candidate 335, because it is growing in popularity or trending among users of the search engine 235 during that interval of time.

Thus, to be considered a potential respective first fresh query suggestion candidate 335, the respective frequency of past use of the second scale 426 of the specific scale associated with the respective recent search query 422 needs to be above a predetermined frequency threshold, which may indicate that the respective recent search query 424 complies with a "popularity" filter, and that is has enough submissions over the predetermined period to be potentially recommended to a user typing a portion of the respective recent search query 424 (or a respective query related thereto). In other embodiments, other techniques may be used to assess growth of the respective frequency of past use of the second scale 426, such as computing a rate of change of a number of submissions over the predetermined interval of time, which may need to be above a predetermined threshold.

Next, the respective recent query 424 may be filtered based on the associated respective user-intent parameter 454. As stated above, the respective user-intent parameter 454 is indicative of a probability that an intent of the user submitting the respective recent query 424 is interacting with a fresh result and/or fresh results vertical domain.

As such, to be considered a potential respective first fresh query suggestion candidate 335, the respective user-intent parameter 454 associated with a respective recent search query 424 needs to be above a predetermined user-intent threshold. The respective recent search query 424 having the respective user-intent parameter 454 over the predetermined user-intent threshold may indicate that, based on historical data and the click model, a user typing a portion of the respective recent search query 424 (or queries related thereto) may want to examine a recent document, and that the respective recent search query 424 should be recommended to future users typing at least a portion of the respective recent search query 424 at the search engine 235. The respective user-intent parameter 454 is thus a complementary indicator that respective recent search query 424 is a respective first fresh query suggestion candidate 335 to be recommended as a completion suggestion to users typing a portion of the respective recent search query 424 (or a respective query related thereto) on the search engine 235.

Then, the respective recent search query 424 may be filtered based on the respective user interaction parameter 456 being above a predetermined user interaction threshold.

The respective user interaction parameter 456 may thus be another mechanism to confirm that the associated recent search query 424 is a respective first fresh query suggestion candidate 335, because a ratio of users having selected or submitted the respective recent search query 424 have interacted with recent documents on a SERP, out of all users who have viewed the SERP provided in response to the recent search query 424.

Briefly speaking, to be considered a respective first fresh query suggestion candidate 335, a respective recent query 424 needs to comply with the following conditions: have a respective frequency of past use of the second scale 426 above a predetermined frequency threshold, have a respective user-intent parameter 454 associated with a predetermined category above a predetermined user-intent parameter threshold, and have a respective user interaction parameter 456 over a predetermined user interaction threshold. Generally, each of the thresholds may be applied sequentially by the plurality of filters 480, starting from the respective frequency of past use of the second scale 426, and may only go to the threshold of the respective user-intent parameter 454 and if the thresholds are satisfied.

In some embodiments, to be considered a respective first fresh query suggestion candidate 335, a respective recent query 424 may need to comply with at least one or at least two of the above listed conditions. Alternatively or additionally, each of the plurality of parameters 452 (i.e. the respective frequency of past use of the second scale 426, respective user-intent parameters 454 and respective user interaction parameter 456) may be weighted, and a total score of the plurality of parameters 452 may need to be above a total threshold (with or without requiring individual thresholds for each of the plurality of parameters 452).

As it may be understood by those skilled in the art, each of the plurality of parameters 452, including the respective frequency of past use of the second scale 426, respective user-intent parameters 454 and respective user interaction parameter 456, associated with the respective recent query 424 may be computed by the suggestion server 260 and saved in the suggestion database 262, such that the plurality of filters 480 are applied during the acquisition of the first set of fresh search query suggestions candidates 332 by the suggestion server 260, as an example by querying the suggestion database 262 and specifying acquisition conditions (i.e. thresholds for the plurality of parameters 452) for each of the respective parameters.

Further, each of the thresholds for the respective frequency of past use of the second scale 426, respective user-intent parameters 454 and respective user interaction parameter 456 may be adjusted dynamically based on feedback (i.e. user interaction s) obtained after suggesting the respective recent search query 424.

Now turning to FIG. 5, the second fresh query candidate aggregator 500 will be described in accordance with non-limiting embodiments of the present technology.

Generally speaking, the purpose of the second fresh query candidate aggregator 500 is to output the second set of fresh search query suggestions candidates 342 based on an indication of a fresh document 502.

For purpose of simplification of the present description, reference will be made to an indication of a single fresh document 502 from which an associated third set of fresh query suggestions candidates 586 has been generated, however as it may be understood by those skilled in the art, the process described herein below may be executed concurrently or/and sequentially for a plurality of fresh documents (not depicted), to generate the second set of fresh search query suggestions candidates 342, which may include the associated third set of fresh query suggestions candidates 586 and one or more respective sets of fresh query suggestions candidates (not depicted) having been generated based on one or more respective fresh documents (not depicted). In one embodiment of the present technology, the second set of fresh search query suggestions candidates 342 generated by the second fresh query candidate aggregator 500 may be thought of as a complementary approach for "polishing" the search query suggestions candidates in the first set of fresh search query suggestions candidates 332 by enriching the search query suggestions candidates with search query suggestions candidates extracted from the indication of the fresh document 502 and other fresh documents, which may be fresh documents appearing in SERPs in response to query suggestion candidates of the first set of fresh search query suggestions candidates 332.

The second fresh query candidate aggregator 500 includes a parser 520, a document retriever 540, a query retriever 560, and a relevance score calculator 580.

The indication of the fresh document 502 may be acquired from the index 244 of the search log database 240 or from another database or source (not depicted). Generally, to be acquired and to be considered a "fresh" document, a given document may need to respect two conditions: (i) have an associated timestamp (which may be the precise time and date at which it was published on the Web or referenced by the search engine 235) within a predetermined interval of time before the current time, day or week (which may or may not be the same predetermined interval of time associated with the respective frequency of past use of the second scale 426 of the respective recent query 424) and (ii) having been published by a resource part of a list of predetermined resources (not depicted). The list of predetermined resources, which may be maintained by the suggestion server 260 or by another source, may contain include a list of resources that are deemed to be trustworthy and/or popular among users of the Internet by operators of the search engine server 230. Such predetermined resources may include, as a non-limiting example, news websites, official websites, academic publications, governmental websites, and the like.

Thus, the two conditions aim to select the given document as a fresh document in response to the given document being a recent document and originating from a trusted and/or popular source, from which the second set of fresh search query suggestions candidates 342 may be generated.

The indication of the fresh document 502 may then be received at the parser 520.

The purpose of the parser 520 is to parse the indication of the fresh document 502 to obtain a title 530 of the fresh document 502, which may be indicative of search terms that could be typed by users on the search engine 235 to access the fresh document 502. Alternatively or additionally, as an example when a resource may be part of the list of predetermined resources but where titles are not always indicative of the content of the documents associated with the resource, the parser 520 may parse at least a portion of the document to extract a title 530 which may be different from the title of the fresh document 502 as defined by the resource. As a non-limiting example, the parsing to extract the title 530 may be based on a term frequency—inverse document frequency (TF-IDF) of the fresh document 502 or other machine learning methods.

The title 530 of the fresh document 502 may then be received at the document retriever 540. In the present embodiment, the document retriever 540 is executed by the search engine 235, however it should be understood that another type of information retrieval application may be used. The title 530 of the fresh document 502 may be submitted as a query on the search engine 235, and a set of documents 550 may be retrieved. The number of documents in the set of documents 550 may be a predetermined number of documents, as an example the top 10 ranked documents based on a relevance score of the documents, or may be documents that satisfy a relevance score threshold.

The set of documents 550 may then be received at the query retriever 560. The query retriever 560 may then acquire, from the search query log 246, for each respective document 552 of the set of documents 550, an associated set of queries 570, each respective query 572 of the associated set of queries 570 having been used to access the respective document 552. In some embodiments, each associated set of queries 570 may be acquired by the query retriever 560 based on factors such as the frequency of past use of the respective query 572 in the set of queries 570. Additionally or alternatively, the number of queries in the set of queries 570 may be a predetermined number of queries.

The indication of the fresh document 502 and each set of queries 570 associated with each of the respective document 552 may be received at the relevance score calculator 580.

Generally speaking, the purpose of the relevance score calculator 580 is to determine a respective relevance score between the fresh document 502 and each respective query 572 of each of the respective set of queries 570. The manner in which the relevance score is determined is not limited, and may be computed by the usual ranking algorithm of the search engine 235, by another ranking algorithm or MLA, or by any other method. As a non-limiting example, the respective relevance score may be determined by the relevance score calculator 580 based on matching features of the fresh document 502 and the respective query 572.

The relevance score calculator 580 may then rank the respective queries 572 according to their respective relevance scores, and select a predetermined number of respective queries 572 to output the second set of fresh search query suggestions candidates 342.

Additionally or alternatively, the relevance score calculator 580 may only select the respective queries 572 having a respective relevance score above a predetermined relevance threshold, and output the second set of fresh search query suggestions candidates 342.

Generally speaking, the second fresh query candidate aggregator 500 may output the third set of fresh search query suggestions candidates 586 based on the assumption that users of the search engine 235 may be interested in seeing the fresh document 502 and/or similar fresh documents, and may thus generate the third set of fresh search query suggestions candidates 586 which contains relevant queries with regard to the fresh document 502, and which may be suggested as query suggestion completion to a user typing a portion of a query included in the second set of fresh search query suggestions candidates 342. Thus, a user selecting a respective third fresh search query suggestion candidate 588 from the third set of fresh search query suggestions candidates 586 when typing a portion of a given search query may be led to a SERP where the fresh document 502 and/or similar documents appear. In alternative embodiments, a user selecting a query suggestion from the second set of fresh search query suggestions candidates 342 on the search engine 235 may be led directly to the fresh document 502.

As explained herein above, the second fresh query candidate aggregator 500 may repeat the process for a plurality of fresh documents to output the second set of fresh search query suggestions candidates 342 which includes the third set of fresh search query suggestions candidates 586 and one or more respective sets of fresh search query suggestions (not depicted), extracted from one or more fresh documents (not depicted). In some embodiments, the one or more fresh documents may be recent documents that have been provided in SERPs and interacted with in response to a respective first search query suggestion candidate 335 of the first set of fresh search query suggestions candidates 332

Figure 5:
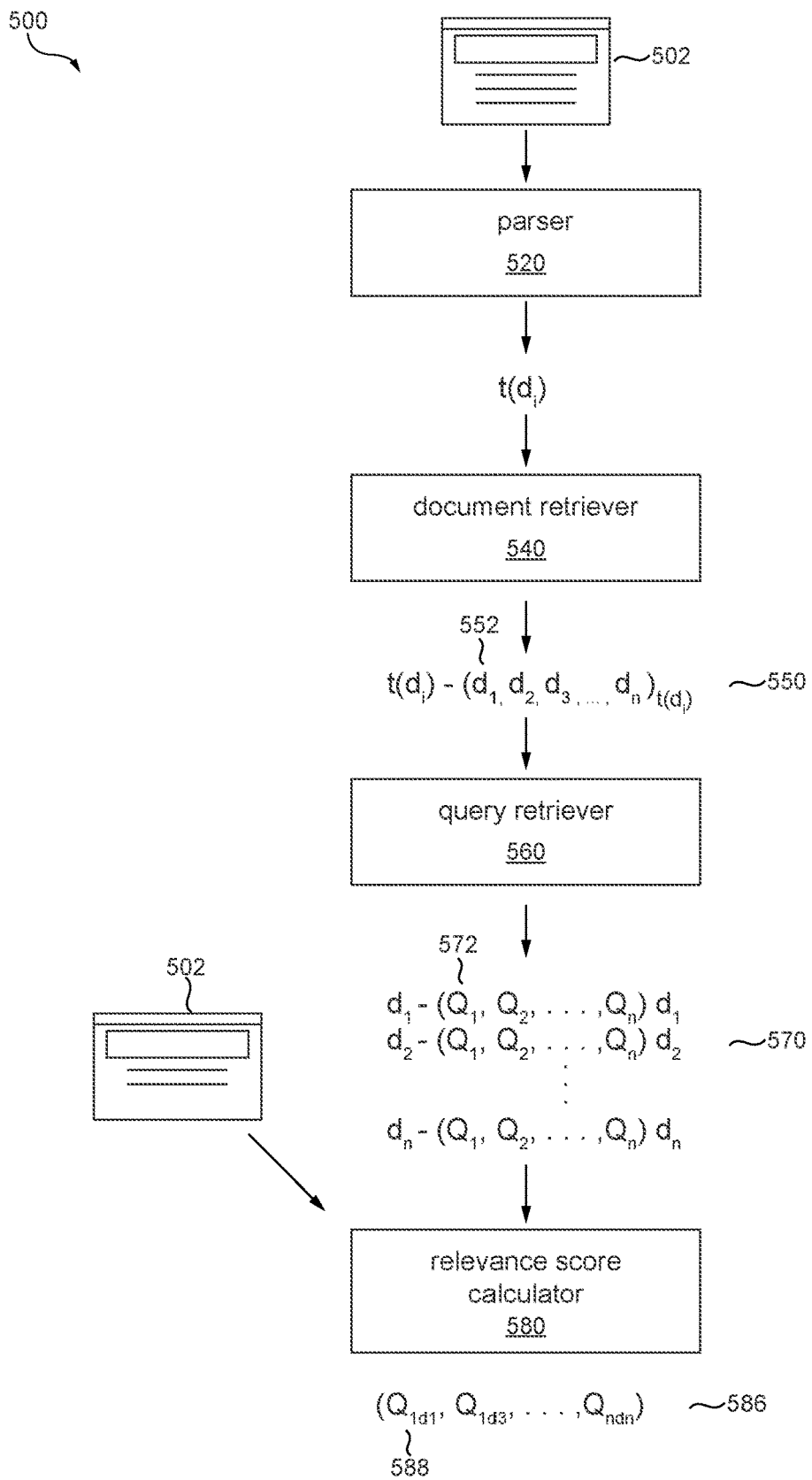
FIG. 5 depicts schematic diagram of a second fresh query candidate aggregator of the search query suggestion system of FIG. 3 in accordance with non-limiting embodiments of the present technology.

Having described, with reference to FIG. 4 and FIG. 5, some non-limiting embodiments of how the first set of fresh search query suggestions candidates 332, and the second set of fresh search query suggestions candidates 342 are generated, we shall now describe how fresh search queries and old search queries may be provided as query suggestions with reference being made back to FIG. 3.

The set of old query suggestions 322, the first set of fresh search query suggestions candidates 332, and the second set of fresh search query suggestions candidates 342 may be received at the scaler 340. In some embodiments, the second set of fresh search query suggestions candidates 342 may bypass the scaler 340, and the set of old query suggestions 322, and the first set of fresh search query suggestions candidates 332 may be received at the scaler 340.

Generally speaking, the purpose of the scaler 340 is to normalize (i.e. have all the frequencies of past use on an identical scale, which may be different from the first or second scale) or adjust (i.e. converting the frequencies of past use from one scale to another, such as converting the frequencies of past use of the first scale to the second scale) the respective frequencies of past use of different scales associated with queries in at least one of the set of old query suggestions 322, the first set of fresh search query suggestions candidates 332. The adjustment of the frequencies of past use to a common scale may allow subsequent selection, comparison and ranking by the ranker 360 to recommend old and fresh queries as suggestion completions to a user typing a portion of a related query on the search engine 235.

In one embodiment of the present technology, the scaler 340 may approximate values of the respective frequency of past use of the second scale 426 to the first scale. As a non-limiting example, if the first scale associated with the frequencies of past use of the set of old query suggestions 322 is one month, and the second scale associated with the frequencies of past use of the first set of fresh search query suggestions candidates 332 is 4 (four) hours, the scaler 340 may approximate the values of frequencies of past use of the first set of fresh search query suggestions candidates 332 to one month, to allow subsequent comparison and ranking based on the frequencies of past use. As such, different factors and statistics on the search engine 235 may be used for the scaling: average number of submitted queries in a day, week, and/or month on the search engine 235, moment in time, period of activity on the search engine 235, personalized parameters (including average number of submitted queries in a day, week, and/or month on the search engine 235 by a user or group of users, period of activity of the user on the search engine 235).

One possible formula for adjusting frequencies of past use to a common scale is the following formula:

$$\frac{F(\text{query}) \cdot F\left(\frac{\text{queries}}{\text{day}}\right)}{F(\text{period})} \cdot nb \text{ of days} \quad \text{Formula 1}$$

Where F (query) is the frequency of past use of the respective recent query, $$F\left(\frac{\text{queries}}{\text{day}}\right)$$

is an average number of queries per day on the search engine 235, F(period) is a popularity score associated with a period of time on the search engine 235, and nb of days is a number of days (e.g. scale) to which we want to adjust the respective frequencies.

As it may be understood by those skilled in the art, other formulas or methods may be used to scale the values of frequencies of past use of different scales associated with queries in at least one of the set of old query suggestions 322, the first set of fresh search query suggestions candidates 332, and the second set of fresh search query suggestions candidates 342.

In some embodiments, the second set of fresh search query suggestions candidates 342 may go through or bypass the scaler 340, since a respective frequency of past use has not necessarily been computed for each respective second fresh search query suggestion candidate 345 of the second set of fresh search query suggestions candidates 342. In other embodiments, a respective frequency of past use associated with each respective second fresh query suggestion candidate 345 of the second set of fresh search query suggestions candidates 342 may be computed, and adjusted by the scaler 340, depending on how the second fresh query candidate aggregator 500 is implemented.

The scaler 340 may then merge the set of old query suggestions 322, the first set of fresh search query suggestions candidates 332, and the second set of fresh search query suggestions candidates 342 to output a combined or amalgamated query suggestion set 350.

The amalgamated query suggestion set 350 may include at least one of: the respective old query suggestion candidate 325, a respective first fresh query suggestion candidate 335 and a respective second fresh query suggestion candidate 345, each of the respective old query suggestion candidate 325, the respective first fresh query suggestion candidate 335 and the respective second fresh query suggestion candidate 345 being associated with a respective frequency of past use of an identical scale 358. In some embodiments, the respective frequency of past use of the identical scale 358 may be the frequency of past use of the first scale.

The amalgamated query suggestion set 350 may then be received at the ranker 360.

Generally speaking, the purpose of the ranker 360 is to rank each of the search query suggestion candidate 325, 335, 345 in the amalgamated query suggestion set 350 based on the associated frequency of past use of the identical scale 358, to obtain a ranked set of query suggestions 385.

Each query suggestion 387 in the ranked set of query suggestions 385 may be ranked in descending order of the respective frequency of past use of the identical scale 358. In some embodiments, the ranker 360 may select a subset of query suggestions from the amalgamated query suggestion set 350 to be included in the ranked set of query suggestions 385 based on the respective frequency of past use of the identical scale 358, e.g. only the top 5 frequency scores may be selected. Additionally or alternatively, the ranker 360 may select suggestion queries to be included in the ranked set of query suggestions 385 based on the respective frequency of past use of the identical scale 358 being above a predetermined frequency threshold. In some embodiments, at least some fresh query suggestions (i.e. obtained from first fresh query candidate aggregator 400 and/or the second fresh query candidate aggregator 500) may be weighted to be ranked higher in the completions suggestions.

The ranked set of query suggestions 385 may then be forwarded to a client device (such as one of the first client device 202, the second client device 204, the third client device 206 and the fourth client device 208) via the search engine 235 of the search engine server 230 to be recommended as search query suggestions to a user typing at least a portion of a given search query.

As previously explained, user interaction s with the query suggestions and the documents provided in response thereto may be tracked by the analytics server 250, and different parameters (such as the respective the frequency of past use of the second scale 426, the respective user-intent parameters 454 and the respective user interaction parameter 456) and/or associated thresholds may be adjusted accordingly based on user feedback.

Having described, with reference to FIG. 3 to FIG. 5, the search query suggestion system 300, the first fresh query candidate aggregator 400, and the second fresh query candidate aggregator 500 in accordance with non-limiting embodiments of the present technology, we shall now describe how fresh search queries and old search queries may be provided as query suggestions with reference to FIG. 6 to FIG. 9.

Figure 6:
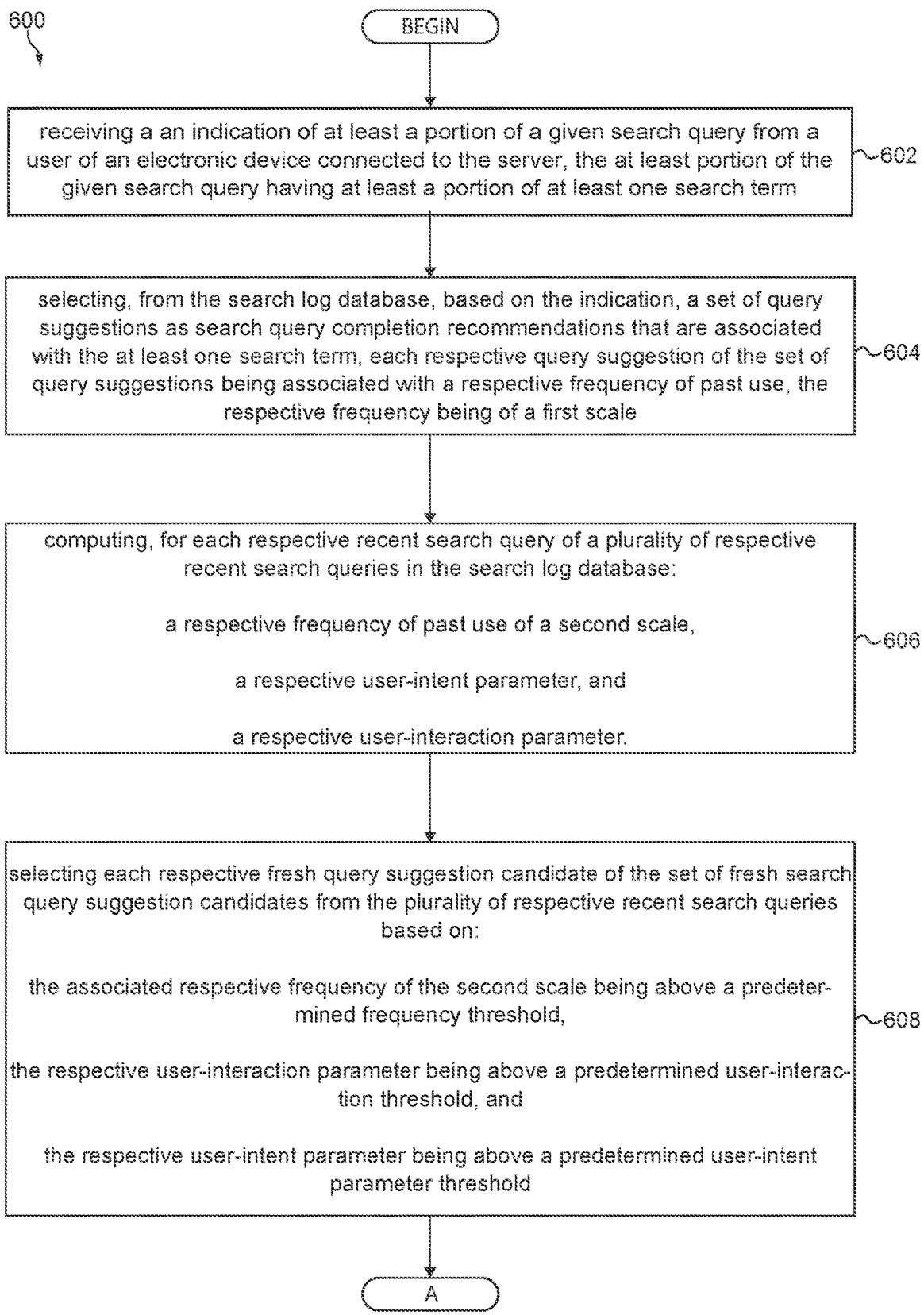
FIGS. 6 and 7 depict a block diagram of a first method for recommending fresh search query suggestions, the method executable within the system of FIG. 1 in accordance with embodiments of the present technology.
Figure 7:
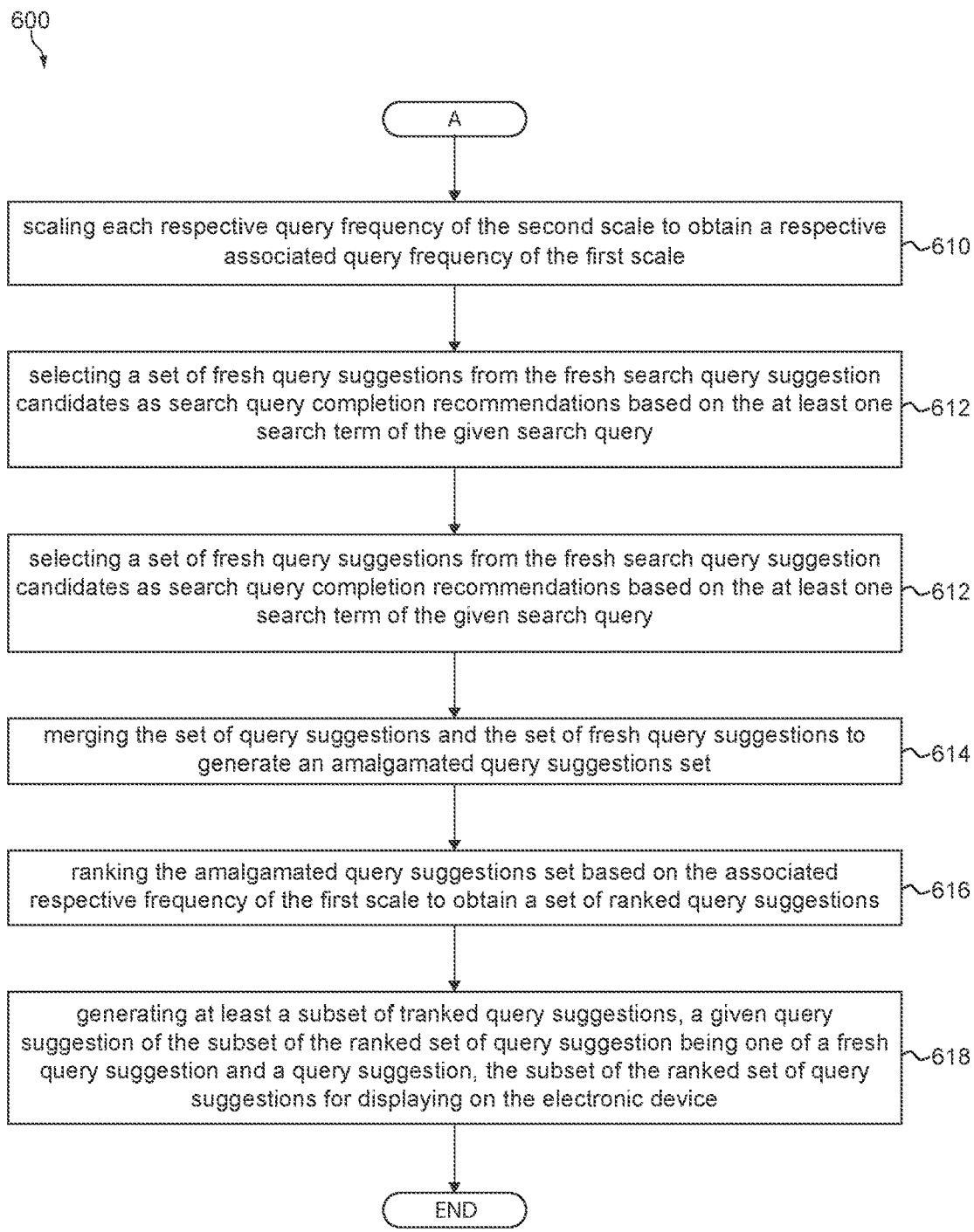

FIG. 6 and FIG. 7 depict a flowchart of a first method 600 of generating a ranked set of query suggestions, a given query suggestion of the ranked set of query suggestion being one of a fresh query suggestion and an old query suggestion according to non-limiting embodiments of the present technology.

The method 600 may begin at step 602.

STEP 602: receiving an indication of at least a portion of a given search query from a user of an electronic device connected to the server At step 602, the search engine server 230 may receive an indication of at least a portion of a given search query at the search engine 235 from a user of one of the first client device 202, the second client device 204, the third client device 206, and the fourth client device 208, the given search query having at least one search term. The indication of at least the portion of the given search query may be sent to the suggestion server 260.

The method 600 may then advance to step 604.

STEP 604: selecting, from the search log database, based on the at least portion of the at least one search term, a set of query suggestions as search query completion recommendations that are associated with the at least one search term, each respective query suggestion of the set of query suggestions being associated with a respective frequency of past use, the respective frequency being of a first scale.

At step 604, the aggregator 310 of the suggestion server 260 may select, from the search log database 240, a set of old query suggestions 322 as search query completion recommendations that are associated with the at least one search term, each respective old query suggestion 325 of the set of old query suggestions 322 being associated with a respective frequency of past use of a first scale 327.

The method 600 may then advance to step 606.

STEP 606: computing, for each respective recent search query of a plurality of respective recent search queries in the search log database:
 a respective frequency of past use of a second scale,
 a respective user-intent parameter, and
 a respective user interaction parameter.

At step 606, the parameter generator 450 the first fresh query candidate aggregator 400 of the suggestion server 260 may compute, for each respective each respective recent search query 424 of a plurality of respective recent search queries 422 in the search log database 240, at least one of a respective plurality of parameters 452, the respective plurality of parameters 452 including a respective frequency of past use of a second scale 426, a respective user-intent parameter 454, and a respective user interaction parameter 456. In some embodiments, the respective user interaction parameter 456 may be a CTR.

The method 600 may then advance to step 608

STEP 608: selecting each respective fresh query suggestion candidate of the set of fresh search query suggestion candidates from the plurality of respective recent search queries based on:
 the associated respective frequency of the second scale being above a predetermined frequency threshold,
 the respective user interaction parameter being above a predetermined user interaction threshold, and
 the respective user-intent parameter being above a predetermined user-intent parameter threshold.

At step 608, the plurality of filters 480 of the first fresh query candidate aggregator 400 of the suggestion server 260 may select each respective first fresh query suggestion candidate 335 of the first set of fresh search query suggestion candidates 332 from the plurality of respective recent search queries 422 based on: the associated respective frequency of the second scale 426 being above a predetermined frequency threshold, the respective user interaction parameter 456 being above a predetermined user interaction threshold, and the respective user-intent parameter 454 being above a predetermined user-intent parameter threshold.

The method 600 may then advance to step 610.

STEP 610: scaling each respective query frequency of the second scale to obtain a respective associated query frequency of the first scale.

At step 610, the scaler 340 of the suggestion server 260 may scale each respective frequency of past use of the second scale 337 associated with a respective first query suggestion candidate 335 of the first set of fresh search query suggestion candidates 332 to obtain a respective frequency of past use of the identical scale 358. In some embodiments, the scaling may be based on an average frequency of search queries submitted by users to the search engine on a given day, an average frequency of search queries submitted by users to the search engine during a given period; and a number of days in a current month.

The method 600 may then advance to step 612.

STEP 612: selecting a set of fresh query suggestions from the fresh search query suggestion candidates as search query completion recommendations based on the at least one search term of the given search query.

At step 612, the scaler 340 may select a set of fresh query suggestions from the first set of fresh search query suggestions candidates 332 as search query completion recommendations based on the at least one search term of the given search query.

The method 600 may then advance to step 614.

STEP 614: merging the set of query suggestions and the set of fresh query suggestions to generate an amalgamated query suggestions set.

At step 614, the scaler 340 may merge the set of old query suggestions 322 and the first set of fresh search query suggestion candidates 332 to obtain an amalgamated query suggestion set 350.

The method 600 may then advance to step 616.

STEP 616: ranking the amalgamated query suggestions set based on the associated respective frequency of the first scale to obtain a set of ranked query suggestions.

At step 616, the ranker 360 may rank the amalgamated query suggestion set 350 based on the respective frequency of the identical scale 358 to obtain a set of ranked query suggestions 385.

The method 600 may then advance to step 618.

STEP 618: generating at least a subset of the ranked set of query suggestions, a given query suggestion of the subset of the ranked set of query suggestion being one of a fresh query suggestion and a query suggestion, the subset of the ranked set of query suggestions for displaying on the electronic device.

At step 618, the ranker 360 may generate at least a subset from the set of ranked query suggestions 385, which may contain queries from the set of old query suggestions 322 and the first set of the fresh search query suggestion candidates 332. The subset of the ranked set of query suggestions 385 may then be forwarded to the search engine 235 of the search engine 235, which may in turn be displayed to the user of one of the first client device 202, the second client device 204, the third client device 206, and the fourth client device 208.

The method 600 may then end.

Figure 8:
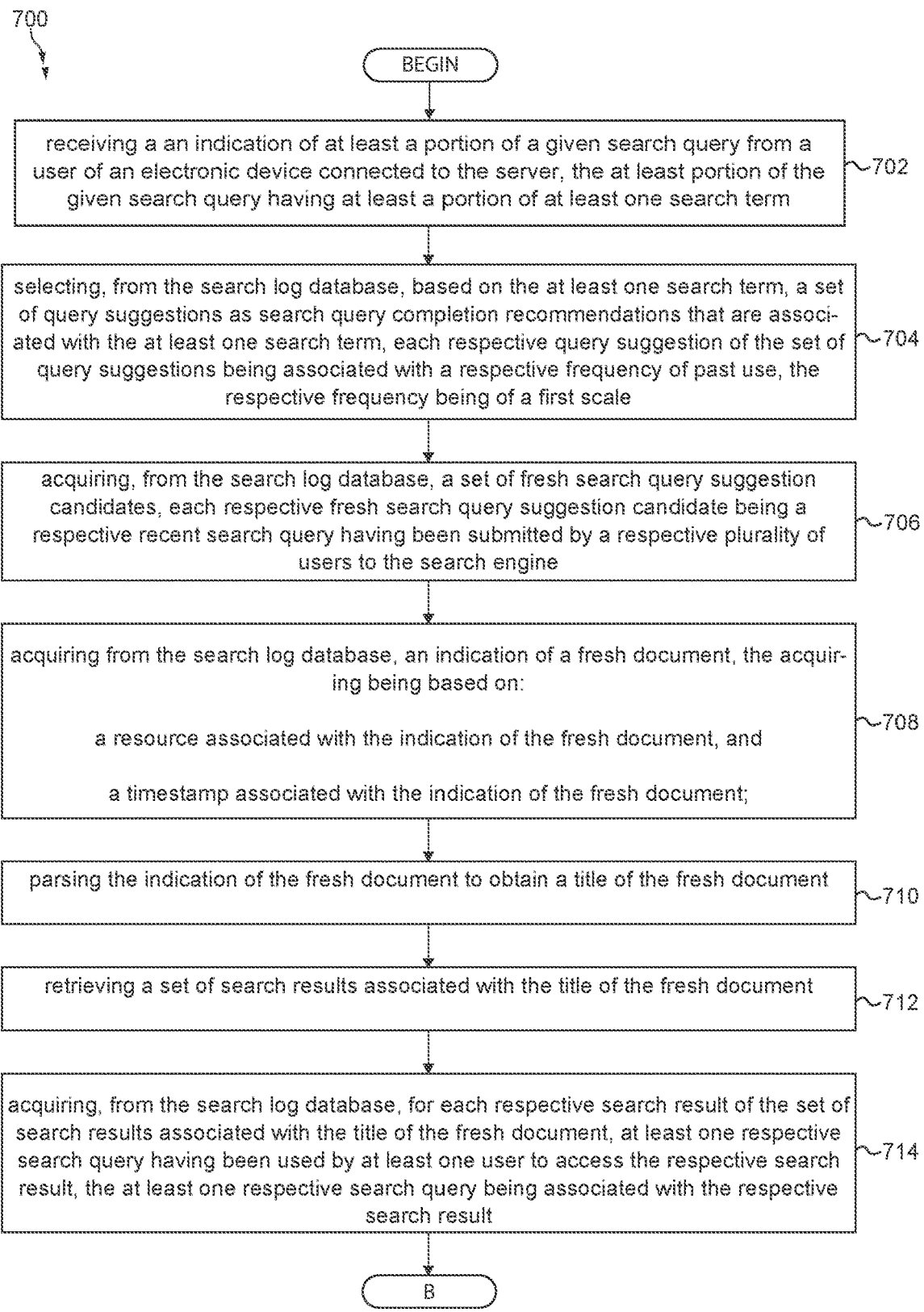
FIGS. 8 and 9 depict a block diagram of a second method for recommending fresh search query suggestions, the method executable within the system of FIG. 1 in accordance with embodiments of the present technology.
Figure 9:
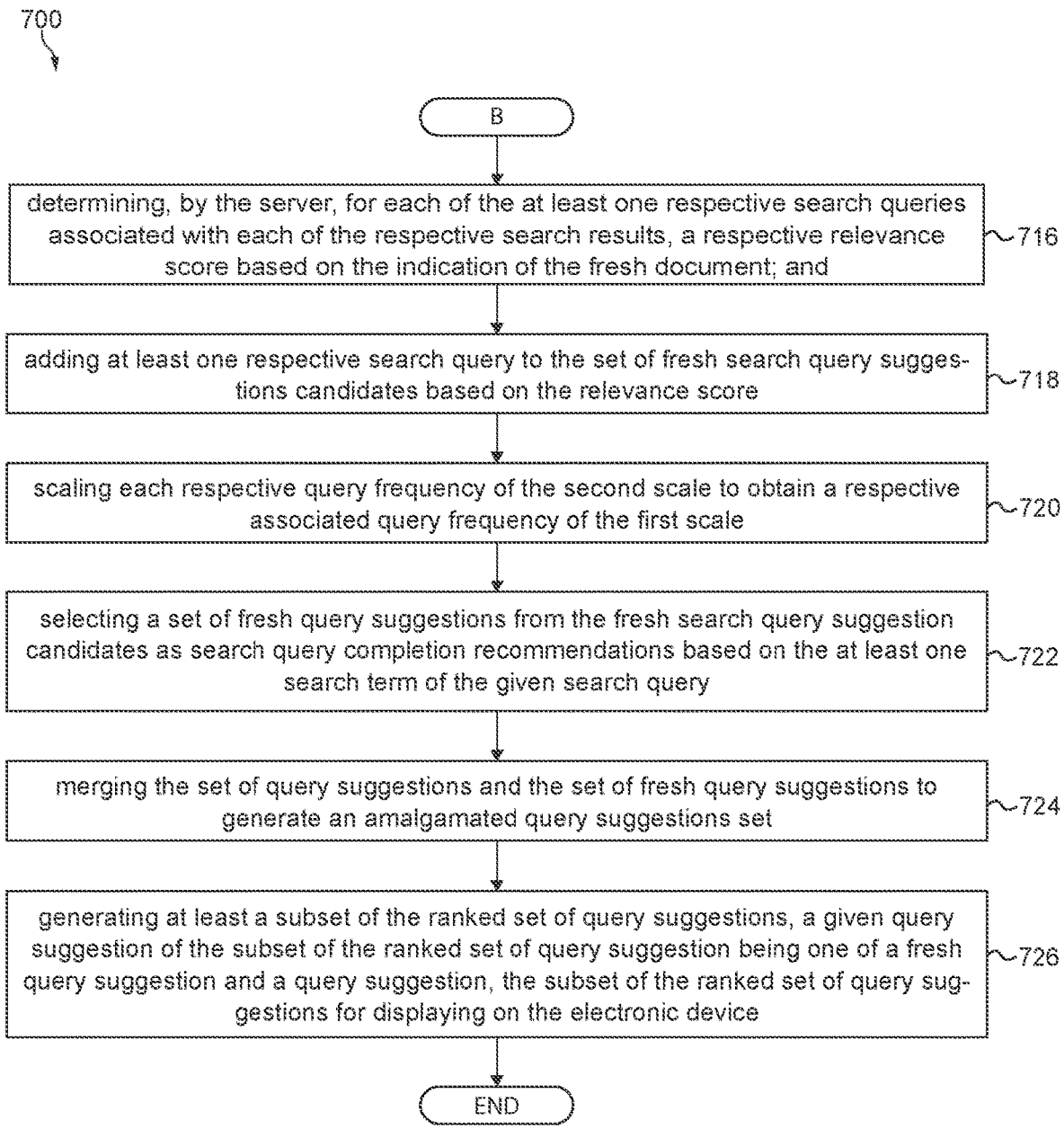

FIG. 8 and FIG. 9 depict a flowchart of a second method 700 of generating a ranked set of query suggestions, a given query suggestion of the ranked set of query suggestion being one of a second fresh query suggestion and an old query suggestion according to non-limiting embodiments of the present technology.

The method 700 may begin at step 702.

STEP 702: receiving at least a portion of a given search query from a user of an electronic device connected to the server, the given search query having at least one search term.

At step 702, the search engine server 230 may receive an indication of at least a portion of a given search query at the search engine 235 from a user of one of the first client device 202, the second client device 204, the third client device 206, and the fourth client device 208, the given search query having at least one search term. The indication of at least the portion of the given search query may be sent to the suggestion server 260.

The method 700 may then advance to step 704.

STEP 704: selecting, by the server from the search log database, based on the at least one search term, a set of query suggestions as search query completion recommendations that are associated with the at least one search term, each respective query suggestion of the set of query suggestions being associated with a respective frequency of past use, the respective frequency being of a first scale.

At step 704, the aggregator 310 of the suggestion server 260 may select, from the search log database 240, a set of old query suggestions 322 as search query completion recommendations that are associated with the at least one search term, each respective old query suggestion 325 of the set of old query suggestions 322 being associated with a respective frequency of past use of a first scale 327.

The method 700 may then advance to step 706.

STEP 706: acquiring from the search log database, an indication of a fresh document, the acquiring being based on:
- a resource associated with the indication of the fresh document, and
- a timestamp associated with the indication of the fresh document;

At step 706, the indication of the fresh document 502 may be acquired from the index 244 of the search log database 240 based on a resource associated with the fresh document being from a list of predetermined resources, and a timestamp associated with the indication of the fresh document being within a predetermined interval of time.

The method 700 may then advance to step 708.

STEP 708: parsing the indication of the fresh document to obtain a title of the fresh document.

At step 708, the parser 520 may parse the indication of the fresh document 502 to obtain a title 530 of the indication of the fresh document 502.

The method 700 may then advance to step 710.

STEP 710: retrieving a set of search results associated with the title of the fresh document.

At step 710, the document retriever 540 may retrieve, from the search query log 246, a set of documents 550 associated with the title 530 of the indication of the fresh document 502. In some embodiments, the set of documents 550 may be a top ranked set of documents obtained by submitting the title 530 on the search engine 235 of the search engine server 230.

The method 700 may then advance to step 712.

STEP 712: acquiring, from the search log database, for each respective search result of the set of search results associated with the title of the fresh document, at least one respective search query having been used by at least one user to access the respective search result, the at least one respective search query being associated with the respective search result.

At step 712, the query retriever 560 may acquire, from the search query log 246, for each respective document 552 of the set of documents 550, an associated set of queries 570, each respective query 572 of the associated set of queries 570 having been used to access the respective document 552.

The method 700 may then advance to step 716.

STEP 716: determining for each of the at least one respective search queries associated with each of the respective search results, a respective relevance score based on the indication of the fresh document.

At step 716, the relevance score calculator 580 may determine a respective relevance score between the fresh document 502 and each respective query 572 of each of the respective set of queries 570.

The method 700 may then advance to step 718.

STEP 718: adding at least one respective search query to the set of fresh search query suggestions candidates based on the relevance score.

At step 718, the relevance score calculator 580 may rank the respective queries 572 based on their respective relevance scores, and select a predetermined number of respective queries 572 to output third set of fresh query suggestions candidates 586.

The method 700 may then advance to step 720 or step 722.

STEP 720: scaling each respective query frequency of the second scale to obtain a respective associated query frequency of the first scale.

Optionally, at step 720, in embodiments where a respective frequency of past use of a given scale is associated with each second respective fresh query suggestion candidate the second set of fresh search query suggestions candidates 342, the scaler 340 may scale each of the respective frequency of past use of a given scale to obtain a respective frequency of the first scale. In some embodiments, the scaling may be based on an average frequency of search queries submitted by users to the search engine on a given day, an average frequency of search queries submitted by users to the search engine during a given period; and a number of days in a current month.

The method 700 may then advance to step 722.

STEP 722: selecting a set of fresh query suggestions from the fresh search query suggestion candidates as search query completion recommendations based on the at least one search term of the given search query.

At step 722, the scaler 340 may select a set of fresh query suggestions from the second set of fresh search query suggestions candidates 342 as search query completion recommendations based on the at least one search term of the given search query.

The method 700 may then advance to step 724.

STEP 724: merging the set of query suggestions and the set of fresh query suggestions to generate an amalgamated query suggestions set.

At step 724, the scaler 340 may merge the set of old query suggestions 322 and the second set of fresh search query suggestions candidates 342 to generate an amalgamated query suggestion set 350.

The method 700 may then advance to step 726.

STEP 726: generating at least a subset of ranked query suggestions, a given query suggestion of the subset being one of a fresh query suggestion and a query suggestion, the subset of ranked query suggestions for displaying on the electronic device.

At step 726, the ranker 360 may generate at least a subset of the ranked set of query suggestions 385, which may include queries from each of the set of old query suggestions 322 and the second set of fresh search query suggestions candidates 342. The subset of the ranked set of query suggestions 385 may then be forwarded to the search engine 235 of the search engine 235, which may in turn be displayed to the user of one of the first client device 202, the second client device 204, the third client device 206, and the fourth client device 208.

The method 700 may then end.

As it may be understood, method 600 and method 700 may be executed in parallel, sequentially, or combined into a single method.

Figure 10:
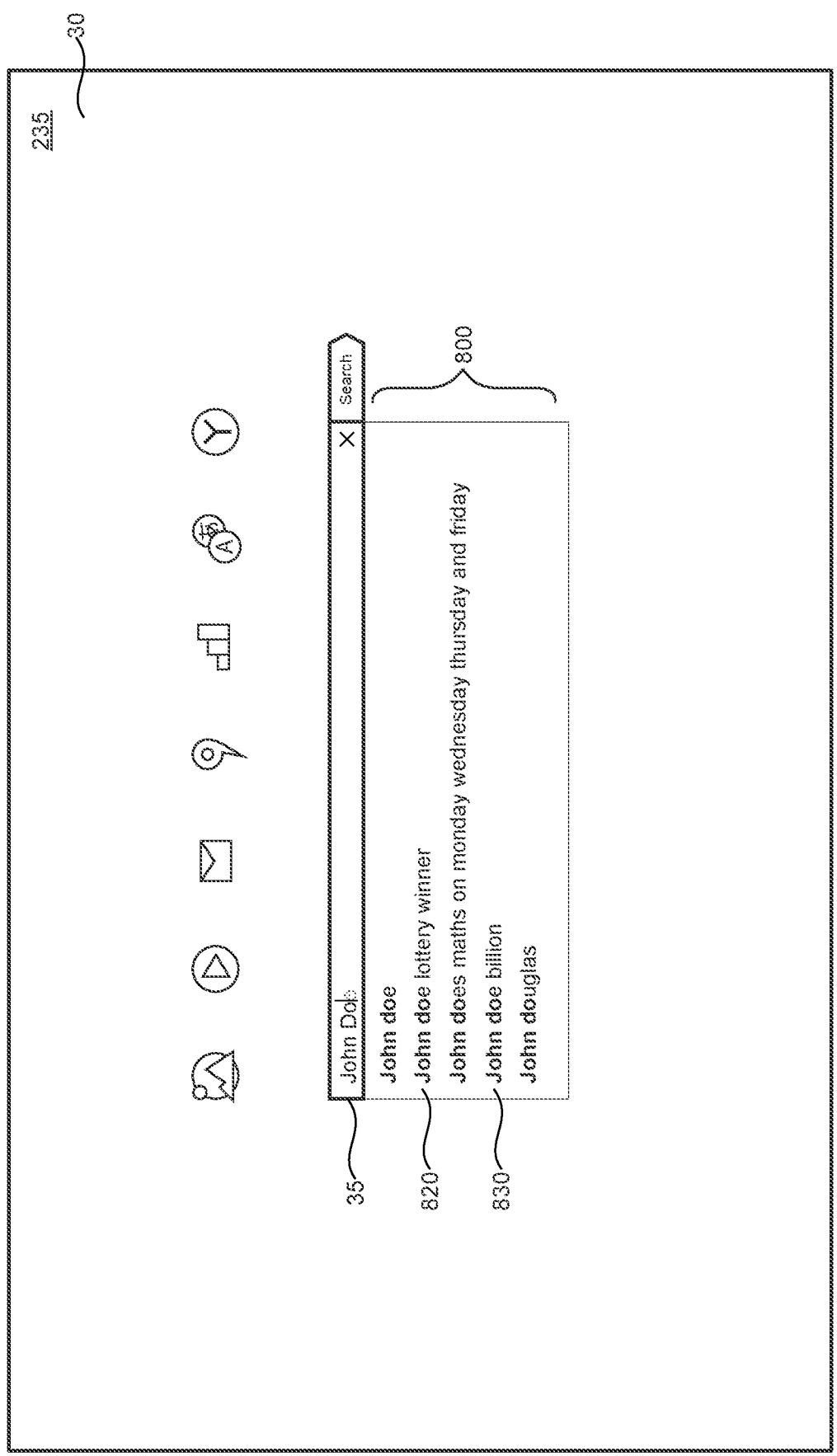
FIG. 10 depicts a search engine interface providing search query suggestions including fresh query suggestions.

With reference to FIG. 10, in one implementation of the present technology, a user now typing a portion of a query "John Doe" in an omnibox 35 of a search engine 235 in a web browser 30 on a client device (which may be one of the first client device 202, the second client device 204, the third client device 206, and the fourth client device 208) may receive a plurality of suggests 800, such as "John Doe mayor of New York City", "John Doe Lottery Winner", "John Douglas", "John Doe billion", "John does maths on monday wednesday thursday and friday", which include a first fresh query suggestion 820 "John Doe Lottery Winner" and a second fresh query suggestion 830 "John Doe billion", which may satisfy intent of a user looking for information about John Doe, winner of the $1 billion prize. The first fresh query suggestion 820 may have been obtained via method 600, and the second fresh query suggestion 830 may have been obtained via method 700.

It should be apparent to those skilled in the art that at least some embodiments of the present technology aim to expand a range of technical solutions for addressing a particular technical problem, namely recommending fresh query suggestions to users on a search engine, which may save bandwidth and computational resources by presenting a search query and associated results that a user may be looking for without going through pages of the SERP, based on a predicted user interaction with the fresh query suggestions and associated search results.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method for recommending fresh search query suggestions in real-time by a search engine, the search engine being executed by a server, the server being connected to a search log database, the method being executed by the server, the method comprising:
   receiving, by the server, an indication of at least a portion of a given search query from a user of an electronic device connected to the server, the indication of the at least portion of the given search query having at least a portion of at least one search term;
   selecting, by the server from the search log database, based on the indication, a set of old query suggestions as search query completion recommendations that are associated with the at least one search term, each respective query suggestion of the set of query suggestions being associated with a respective frequency of past use, the respective frequency being of a first scale;
   acquiring, by the server from the search log database, a set of fresh search query suggestion candidates, each respective fresh search query suggestion candidate being a respective recent search query having been submitted by a respective plurality of users to the search engine not included among the set of old query suggestions, each respective fresh search query suggestion candidate being associated with a respective frequency of past use, the respective frequency being of a second scale, the frequency of the second scale having been computed over a shorter period of time before the current time than the frequency of the first scale;
   scaling, by the server, each respective query frequency of the second scale to obtain a respective associated query frequency of the first scale;
   selecting, by the server, a set of fresh query suggestions from the fresh search query suggestion candidates as search query completion recommendations based on the indication of the at least portion of the given search query;
   merging, by the server, the set of query suggestions and the set of fresh query suggestions to generate an amalgamated query suggestions set; and
   generating, by the server, at least a subset of ranked query suggestions based on the amalgamated query suggestions set, a given query suggestion of the subset of ranked query suggestions being one of a fresh query suggestion and a query suggestion, the subset of ranked query suggestions for displaying on the electronic device.

2. The method of claim 1, wherein:
the at least subset of ranked query suggestions has been generated from a set of ranked query suggestions; and
prior to the generating, the method further comprises:
   ranking, by the server, the amalgamated query suggestions set based on the associated respective frequency of the first scale to obtain the set of ranked query suggestions.

3. The method of claim 2, wherein:
the search log database has a plurality of respective recent search queries; and
prior to the acquiring, the method further comprises:
   selecting, by the server, each respective fresh query suggestion candidate of the set of fresh search query suggestion candidates from the plurality of respective recent search queries based on the associated respective frequency of the second scale being above a predetermined frequency threshold.

4. The method of claim 3, wherein:
the selecting each of the respective fresh query suggestion candidates from the plurality of respective recent search queries further comprises:
   computing, by the server, for each of the respective fresh query suggestion candidates having the associated respective frequency of the second scale above the predetermined frequency threshold, a respective user interaction parameter being indicative of past user interactions with at least one recent search result obtained in response to the respective recent search query; and
the selecting each of the respective fresh query suggestion candidates from the plurality of respective recent search queries is further based on the respective user interaction parameter being above a predetermined user interaction threshold.

5. The method of claim 4, wherein:
the selecting each of the respective fresh query suggestion candidates from the plurality of respective recent search queries further comprises:
   computing, by the server, for each of the respective fresh query suggestion candidates having the associated respective frequency of the second scale above the predetermined frequency threshold, a respective user-intent parameter being indicative of a probability of the respective recent search query being part of a predetermined search domain; and the selecting each of the respective fresh query suggestion candidates from the plurality of respective recent search queries is further based on the respective user-intent parameter being above a predetermined user-intent parameter threshold.

6. The method of claim 5, wherein the scaling each of the respective query frequency of the second scale to obtain the respective associated query frequency of the first scale is based on:
- an average frequency of search queries submitted by users to the search engine on a given day;
- an average frequency of search queries submitted by users to the search engine during a given period; and
- a number of days in a current month.

7. The method of claim 6, wherein the selecting each of the respective fresh query suggestion candidates from the plurality of respective recent search queries is further based on a domain name associated with each of the plurality of recent queries in the search log database.

8. The method of claim 7, wherein the selecting each of the respective fresh query suggestion candidates from the plurality of respective recent search queries is further based on search terms of the respective recent search query not being part of an inappropriate search term list.

9. The method of claim 8, wherein the respective user interaction parameter is a click-through rate (CTR).

10. The method of claim 9, wherein the CTR is calculated based on fresh results only.

11. The method of claim 10, wherein a given fresh query suggestion candidate is selected only in response to the CTR being based on fresh results being above a predetermined threshold.

12. The method of claim 11, wherein the predetermined search domain is a fresh vertical domain.

13. The method of claim 1, wherein the method further comprises, prior to the scaling:
- acquiring, by the server from the search log database, an indication of a fresh document, the acquiring being based on:
  - a resource associated with the indication of the fresh document, and
  - a timestamp associated with the indication of the fresh document;
- parsing, by the server, the indication of the fresh document to obtain a title of the fresh document;
- retrieving, by the server, a set of search results associated with the title of the fresh document;
- acquiring, by the server from the search log database, for each respective search result of the set of search results associated with the title of the fresh document, at least one respective search query having been used by at least one user to access the respective search result, the at least one respective search query being associated with the respective search result;
- determining, by the server, for each of the at least one respective search queries associated with each of the respective search results, a respective relevance score based on the indication of the fresh document; and
- adding, by the server, at least one respective search query to the set of fresh search query suggestions candidates based on the relevance score.

14. The method of claim 13, wherein the acquiring is further based on:
- the resource associated with the indication of the fresh document being a predetermined resource of a list of predetermined resources.

15. The method of claim 14, wherein the acquiring is further based on:
- the timestamp associated with the indication of the fresh document being within a predetermined time interval.

16. The method of claim 15, wherein the adding the at least one respective search query to the set of fresh search query suggestion candidates is further based on:
- the respective relevance score being above a predetermined score threshold.

17. The method of claim 16, wherein:
- the at least one respective search query includes at least one respective search term; and
- the determining the respective relevance score is further based on the at least one respective search term.

18. The method of claim 17, wherein the set of search results associated with the title of the fresh document has a predetermined number of search results.

19. The method of claim 18, wherein the respective relevance score is computed by a ranking algorithm of the search engine.

20. A system for recommending fresh search query suggestions in real-time, the system executing a search engine, the system being connected to a search log database, the system comprising:
- a processor;
- a non-transitory computer-readable medium comprising instructions, the processor;
- upon executing the instructions, being configured to:
  - receive an indication of at least a portion of a given search query from a user of an electronic device connected to the system, the indication of the at least portion of the given search query having at least a portion of at least one search term;
  - select, from the search log database, based on the indication, a set of old query suggestions as search query completion recommendations that are associated with the at least one search term, each respective query suggestion of the set of query suggestions being associated with a respective frequency of past use, the respective frequency being of a first scale;
  - acquire, from the search log database, a set of fresh search query suggestion candidates, each respective fresh search query suggestion candidate being a respective recent search query having been submitted by a respective plurality of users to the search engine not included among the set of old query suggestions, each respective fresh search query suggestion candidate being associated with a respective frequency of past use, the respective frequency being of a second scale, the frequency of the second scale having been computed over a shorter period of time before the current time than the frequency of the first scale;
  - scale each respective query frequency of the second scale to obtain a respective associated query frequency of the first scale;
  - select a set of fresh query suggestions from the fresh search query suggestion candidates as search query completion recommendations based on the indication of the at least portion of the given search query;
  - merge, the set of query suggestions and the set of fresh query suggestions to generate an amalgamated query suggestions set; and
  - generate at least a subset of ranked query suggestions based on the amalgamated query suggestion set, a given query suggestion of the subset of ranked query suggestions being one of a fresh query suggestion and a query suggestion, the subset of ranked query suggestions for displaying on the electronic device.

21. The system of claim 20, wherein:
the at least subset of ranked query suggestions has been generated from a set of ranked query suggestions; and
prior to the generating, the processor is further configured to:
rank the amalgamated query suggestions set based on the associated respective frequency of the first scale to obtain the set of ranked query suggestions.

22. The system of claim 21, wherein:
the search log database has a plurality of respective recent search queries; and
prior to the acquiring, the processor is further configured to:
select each respective fresh query suggestion candidate of the set of fresh search query suggestion candidates from the plurality of respective recent search queries based on the associated respective frequency of the second scale being above a predetermined frequency threshold.

23. The system of claim 22, wherein:
the selecting each of the respective fresh query suggestion candidates from the plurality of respective recent search queries further comprises:
computing for each of the respective fresh query suggestion candidates having the associated respective frequency of the second scale above the predetermined frequency threshold, a respective user interaction parameter being indicative of past user interactions with at least one recent search result obtained in response to the respective recent search query; and
the selecting each of the respective fresh query suggestion candidates from the plurality of respective recent search queries is further based on the respective user interaction parameter being above a predetermined user interaction threshold.

24. The system of claim 23, wherein:
the selecting each of the respective fresh query suggestion candidates from the plurality of respective recent search queries further comprises:
computing for each of the respective fresh query suggestion candidates having the associated respective frequency of the second scale above the predetermined frequency threshold, a respective user-intent parameter being indicative of a probability of the respective recent search query being part of a predetermined search domain; and
the selecting each of the respective fresh query suggestion candidates from the plurality of respective recent search queries is further based on the respective user-intent parameter being above a predetermined user-intent parameter threshold.

25. The system of claim 24, wherein the scaling each of the respective query frequency of the second scale to obtain the respective associated query frequency of the first scale is based on:
an average frequency of search queries submitted by users to the search engine on a given day;
an average frequency of search queries submitted by users to the search engine during a given period; and
a number of days in a current month.

26. The system of claim 25, wherein the selecting each of the respective fresh query suggestion candidates from the plurality of respective recent search queries is further based on a domain name associated with each of the plurality of recent queries in the search log database.

27. The system of claim 25, wherein the selecting each of the respective fresh query suggestion candidates from the plurality of respective recent search queries is further based on search terms of the respective recent search query not being part of an inappropriate search term list.

28. The system of claim 27, wherein the respective user interaction parameter is a click-through rate (CTR).

29. The system of claim 28, wherein the CTR is calculated based on fresh results only.

30. The system of claim 29, wherein a given fresh query suggestion candidate is selected only in response to the CTR being based on fresh results being above a predetermined threshold.

31. The system of claim 30, wherein the predetermined search domain is a fresh vertical domain.

32. The system of claim 20, wherein the processor is further configured to, prior to the scaling:
acquire, from the search log database, an indication of a fresh document, the acquiring being based on:
a resource associated with the indication of the fresh document, and
a timestamp associated with the indication of the fresh document;
parse the indication of the fresh document to obtain a title of the fresh document;
retrieve a set of search results associated with the title of the fresh document;
acquire, from the search log database, for each respective search result of the set of search results associated with the title of the fresh document, at least one respective search query having been used by at least one user to access the respective search result, the at least one respective search query being associated with the respective search result;
determine, for each of the at least one respective search queries associated with each of the respective search results, a respective relevance score based on the indication of the fresh document; and
add at least one respective search query to the set of fresh search query suggestions candidates based on the relevance score.

33. The system of claim 32, wherein the acquiring is further based on:
the resource associated with the indication of the fresh document being a predetermined resource of a list of predetermined resources.

34. The system of claim 33, wherein the acquiring is further based on:
the timestamp associated with the indication of the fresh document being within a predetermined time interval.

35. The system of claim 34, wherein the adding the at least one respective search query to the set of fresh search query suggestion candidates is further based on:
the respective relevance score being above a predetermined score threshold.

36. The system of claim 35, wherein:
the at least one respective search query includes at least one respective search term; and
the determining the respective relevance score is further based on the at least one respective search term.

37. The system of claim 36, wherein the set of search results associated with the title of the fresh document has a predetermined number of search results.

38. The system of claim 37, wherein the respective relevance score is computed by a ranking algorithm of the search engine.

* * * * *